TEN KEY COIN ISSUING DEVICE

Filed Sept. 3, 1946 17 Sheets-Sheet 1

INVENTORS
Robert H. Damon
Harold E. Forester
Francis C. Sturrock
By: Edmund W. Kamm
Atty.

INVENTOR.
Robert H. Damon
Harold E. Forester
Francis C. Sturrock
By: Edmund W. C. Kamm
Atty.

TEN KEY COIN ISSUING DEVICE

Filed Sept. 3, 1946 17 Sheets-Sheet 3

INVENTORS
Robert H. Damon
Harold E. Forester
Francis C. Sturrock
By: Edmund W.E. Kamm
Atty.

INVENTORS
Robert H. Damon
Harold E. Forester
Francis C. Sturrock
By: Edmund W. E. Kamm
Atty.

Aug. 5, 1952 R. H. DAMON ET AL 2,605,774

TEN KEY COIN ISSUING DEVICE

Filed Sept. 3, 1946 17 Sheets-Sheet 5

INVENTORS

Robert H. Damon

Harold E. Forester

Francis C. Sturrock

By: Edmund W. E. Kamm

Atty.

Aug. 5, 1952
R. H. DAMON ET AL
2,605,774
TEN KEY COIN ISSUING DEVICE
Filed Sept. 3, 1946
17 Sheets-Sheet 6
Fig. 28
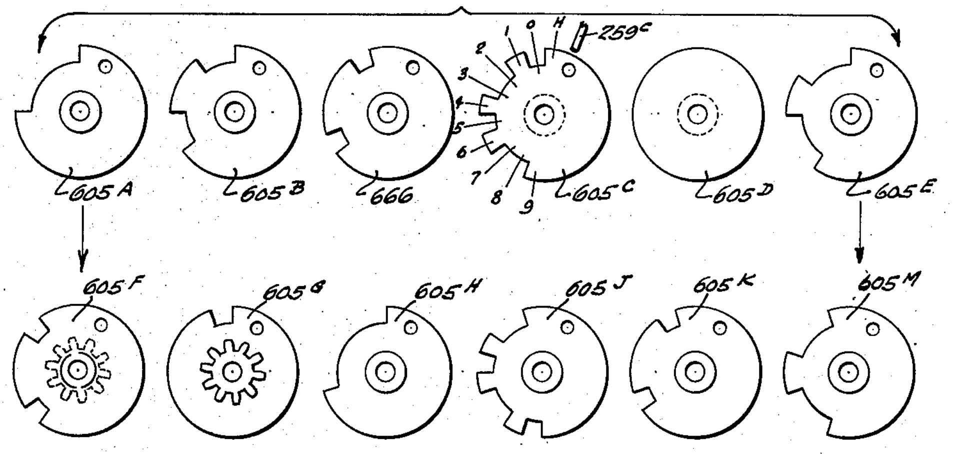
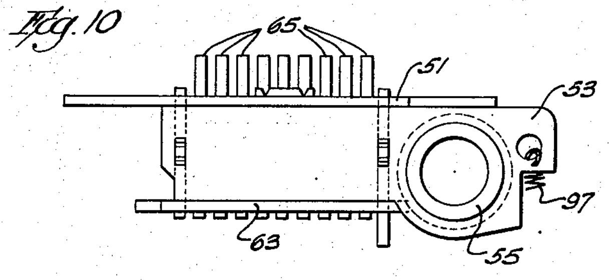
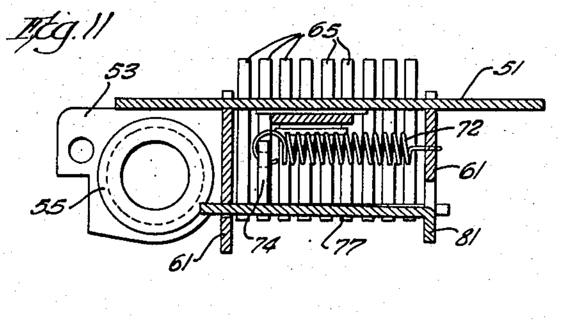
INVENTORS
Robert H. Damon
Harold E. Forester
Francis C. Sturrock
Edmund W. E. Kamm
Atty.

Aug. 5, 1952 R. H. DAMON ET AL 2,605,774

TEN KEY COIN ISSUING DEVICE

Filed Sept. 3, 1946 17 Sheets-Sheet 7

INVENTORS
Robert H. Damon
Harold E. Forester
Francis C. Sturrock
By: Edmund W. E. Kamm
Atty.

INVENTORS

Robert H. Damon

Harold E. Foriester

Francis C. Sturrock

By Edmund W. E. Kamm

Atty.

Aug. 5, 1952 R. H. DAMON ET AL 2,605,774

TEN KEY COIN ISSUING DEVICE

Filed Sept. 3, 1946 17 Sheets-Sheet 9

INVENTORS
Robert H. Damon
Harold E. Forester
Francis C. Sturrock
By Edmund W. E. Kamm
Atty.

Aug. 5, 1952 R. H. DAMON ET AL 2,605,774

TEN KEY COIN ISSUING DEVICE

Filed Sept. 3, 1946 17 Sheets-Sheet 10

INVENTORS
Robert H. Damon
Harold E. Forester
Francis C. Sturrock
By Edmund W. E. Kamm
Atty.

TEN KEY COIN ISSUING DEVICE

Filed Sept. 3, 1946 17 Sheets-Sheet 11

INVENTORS
Robert H. Damon
Harold E. Forester
Francis C. Sturrock
By: Edmund W. E. Kamm
Atty.

Aug. 5, 1952 R. H. DAMON ET AL 2,605,774

TEN KEY COIN ISSUING DEVICE

Filed Sept. 3, 1946 17 Sheets-Sheet 12

INVENTORS
Robert H. Damon
Harold E. Forester
Francis C. Sturrock
By Edmund W. E. Kamm
Atty.

TEN KEY COIN ISSUING DEVICE

Filed Sept. 3, 1946 17 Sheets-Sheet 13

INVENTORS
Robert H. Damon
Harold E. Forester
Francis C. Sturrock
By Edmund W. E. Kimm
Atty.

INVENTORS
Robert H. Damon
Harold E. Forester
Francis C. Sturrock
By: Edmund W. E. Kamm
Atty.

INVENTORS
Robert H. Damon
Harold E. Forester
Francis C. Sturrock
By: Edmund W. E. Kamm
Atty.

Aug. 5, 1952 R. H. DAMON ET AL 2,605,774

TEN KEY COIN ISSUING DEVICE

Filed Sept. 3, 1946 17 Sheets-Sheet 16

INVENTORS
Robert H. Damon
Harold E. Forester
Francis C. Sturrock
By: Edmund W. E. Kamm
Atty.

Aug. 5, 1952 R. H. DAMON ET AL 2,605,774

TEN KEY COIN ISSUING DEVICE

Filed Sept. 3, 1946 17 Sheets-Sheet 17

INVENTORS
Robert H. Damon
Harold E. Forester
Francis C. Sturrock
By: Edmund W. E. Kamm
Atty.

Patented Aug. 5, 1952

2,605,774

UNITED STATES PATENT OFFICE 2,605,774

TEN KEY COIN ISSUING DEVICE

Robert H. Damon, Harold E. Forester, and Francis C. Sturrock, Chicago, Ill., assignors to Johnson Fare Box Company, Chicago, Ill., a corporation of Delaware Application September 3, 1946, Serial No. 694,548

48 Claims. (Cl. 133—4)

This invention relates to a mechanism for issuing checks, that is, either tokens or coins in accordance with the selection made by the operator on a keyboard; more specifically, it relates to a mechanism which will issue a predetermined number of coins of predetermined value in response to the keys punched by an operator.

It is usual in machines of the type described to provide a keyboard which has ten horizontal rows of keys or buttons, each row containing at least three keys to make a total of thirty selecting keys. The operator must strike the proper keys in the proper rows to secure the proper change. In applicant's device only ten keys are provided instead of thirty and to issue coins having a value in excess of nine cents, two keys must be struck in succession.

It is therefore an object of the invention to provide a coin issuing device in which only ten selecting keys are used.

It is another object of the invention to provide an issuing machine in which the coin magazines are detachable as a unit, with the coins, for accounting purposes.

Another object of the invention is to provide a mechanism which is speedy in operation and positive in performance.

Still another object of the invention is to provide a cashier in which change in any amount up to one dollar can be issued in a single operation.

Still another object of the invention is to provide a coin issuing device which by relatively simple changes can be made either as a payer to issue the amount set up on the keys or as a changer to issue the difference between the amount set up and a dollar.

Yet another object of the invention is to provide a cycling mechanism which will cause the various mechanical functions to be executed in predetermined order and in turned relation to each other.

Another object of the invention is to provide a coin issuing device which is rendered inoperative when any coin magazine becomes exhausted.

Still another object of the invention is to provide a series of cams which are settable to different positions in accordance with the value of the keys operated and will cause the ejection of a corresponding value in coins.

A further object of the invention is to provide two sets of cams, one of which responds to the units value and the other to the tens value of the keys operated for producing the ejection of coins of the required value.

Yet another object of the invention is to provide a coin issuing device which will eject coins having a value equal to the difference between a dollar and the value set up on the keyboard.

Still another object is to provide, in such a machine, means for withholding a portion of the coins which would be ordinarily ejected to handle cases where less than a dollar is paid in.

Yet another object of the invention is to provide cam means, arranged in groups, each group moving as a unit to any one of ten positions, and each group in each position being adapted to actuate coin ejectors in a predetermined pattern.

Still another object is to arrange the patterns of the cams of one group so that no coins will be issued in the position determined by the operation of the zero key, one cent in that determined by the one key and so forth.

Another object of the invention is to arrange the pattern of the cams in the other group so that coins equivalent to ten cents will be issued in response to the number one key, twenty cents for the number two key and so forth.

A further object of the invention is to provide a cam pattern which will issue the difference between ten and the value of the key pressed on each bank of cams.

These and other objects will become apparent from a study of this specification and the drawings which are attached hereto and made a part hereof and in which:

Figure 11 is a sectional view of the mechanism of Figure 7 taken substantially on the line 11—11 thereof.

Figure 16 is an enlarged rear view showing the driving and cycle controlling means, together with some of the resetting means.

Figure 28 is an elevation of the cams used in the changer unit, the upper row representing the tens cams and the lower row the units cams.

GENERAL DESCRIPTION

Figure 1:
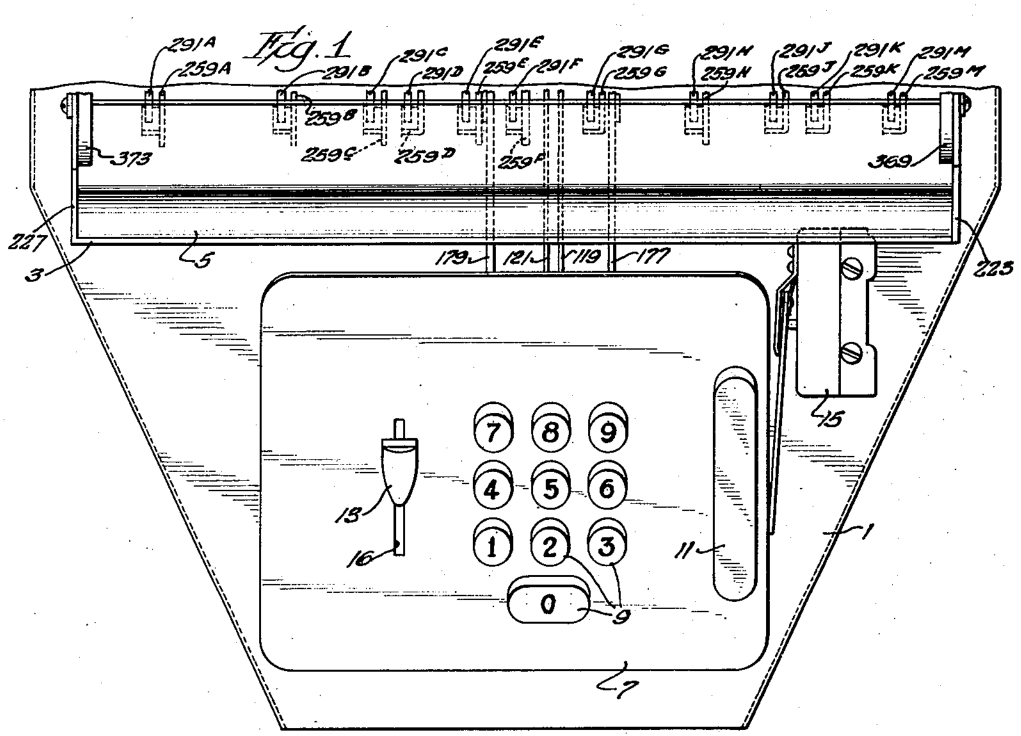
Figure 1 is a top view of the keyboard of the payer showing the ten keys, the reset key and the motor bar.

It may be well to differentiate, at the outset, between the two forms of the machine disclosed herein. The first to be described is a "Payer" in which the exact sum to be issued is selected on the keyboard and when the motor bar is depressed, the machine cycles and issues the preselected amount of money. Thus if 71 cents are to be issued, the 7 and the 1 keys are pushed in that order and, upon actuation of the motor bar, 71 cents are ejected.

The modified form of the machine is designated a "Changer" in which the keys are used to set up the amount which is to be withheld from the amount offered, and the difference between the amount offered and the amount to be withheld is ejected by the machine.

The basic plan of the machine provides for issuing the difference between the cost and one dollar. It is obvious, however, that provision must be made for amounts offered under one dollar and to accomplish this, hold keys have been supplied in values of 25, 50 and 75 cents. Thus if 50 cents is offered and 30 cents is to be withheld, it will be necessary to hold 50 cents and issue 20 since the machine would normally return change for a dollar. In case 25 cents were offered and 15 cents are to be withheld, it would be necessary to hold 75 cents and issue the complement of 10 cents.

The difference in the two machines lies primarily in the provision of a different set of cams and in the provision of the holding mechanism described briefly above.

With this preliminary explanation, we shall proceed with the description of the payer.

PAYER

Referring to Figure 1, it will be seen that numeral 1 indicates a base member upon which is supported a front plate 3 which is formed with a coin trough 5.

A keyboard cover plate 7 is also supported on the base and push buttons 9 are disposed above the plate. Ten buttons numbered from zero to nine are provided. A motor bar 11 and a keyboard clearing button 13 are also provided. The lever 14 on which 13 is mounted operates in slot 16. A normally closed release switch 15 is also shown in this view.

Figure 2:
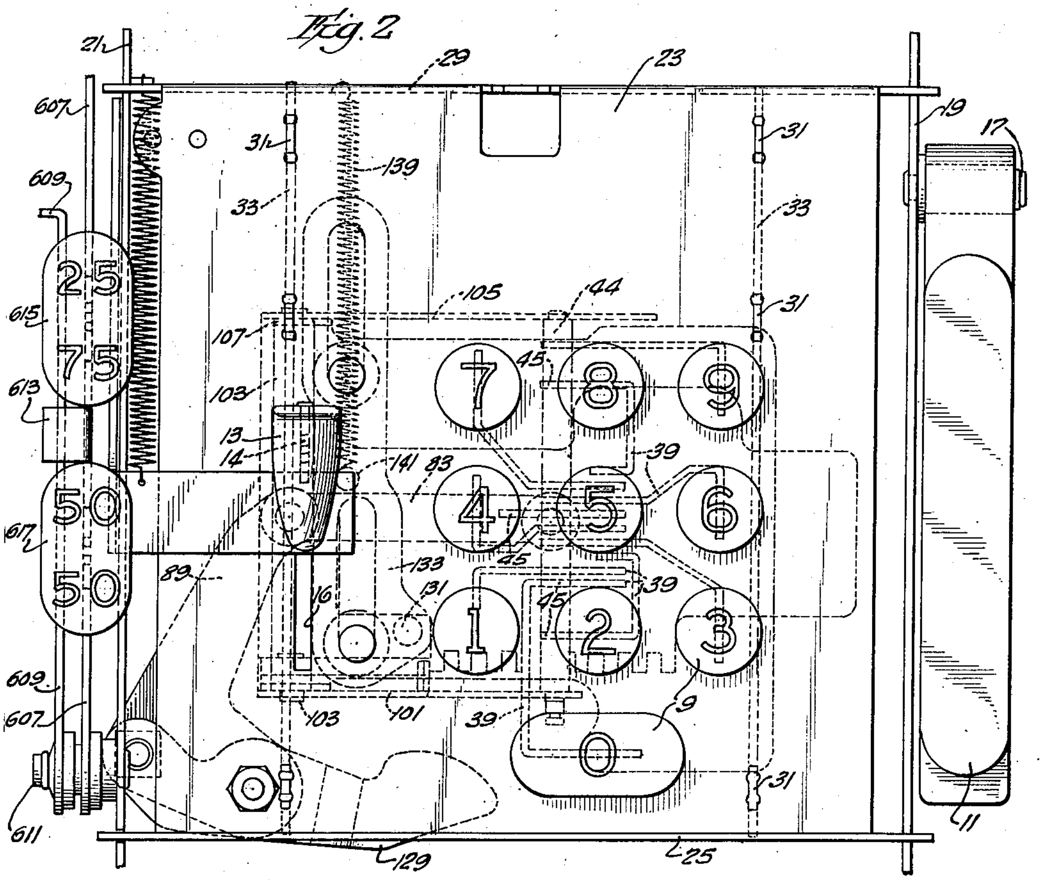
Figure 2 is a top view of the changer keyboard showing the connections between the keys and the selector mechanism actuators, which is the same as that of Figure 1 except that it has, in addition, two withholding keys.
Figure 3:
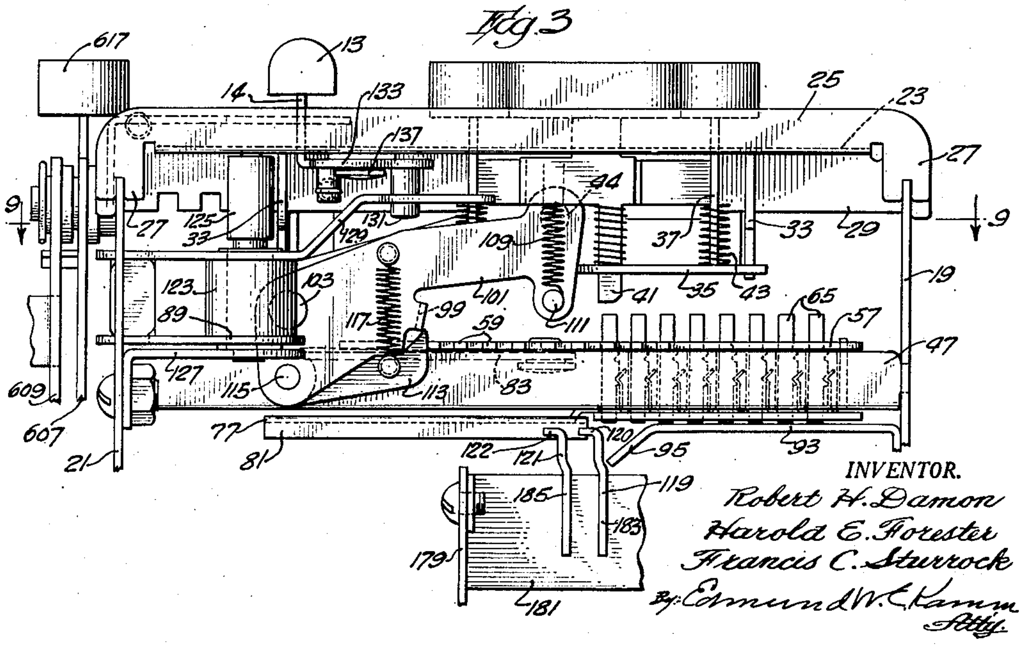
Figure 3 is an end elevation of the mechanism of Figure 2.
Figure 27:
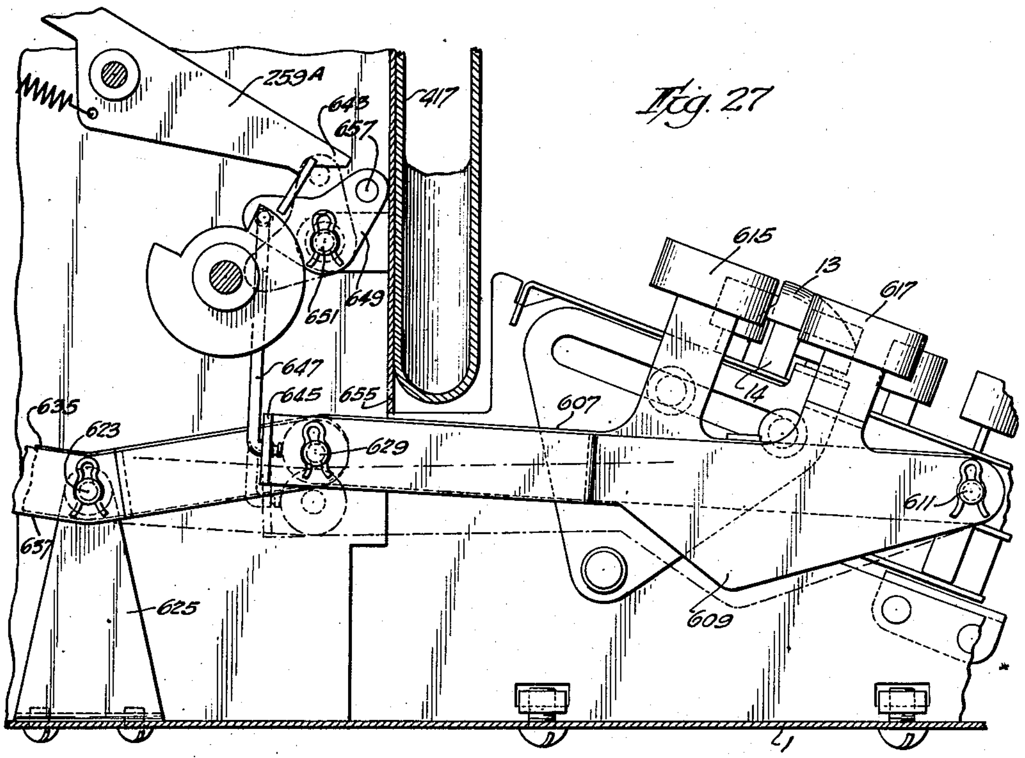
Figure 27 is a view of the left side of the keyboard used in the payout machine showing the coin trough, the hold keys and the fifty-cent withholding means.

Referring now to Figures 2 and 3, it will be be seen that the motor bar 11 is pivoted on a stud 17 which is fixed in a keyboard side frame 19 which is fixed to base 1. A second, parallel side frame 21 is also fixed to the base. A keyboard support plate 23 has an upturned lower edge 25, provided with downwardly projections 27, and a downturned upper edge 29. The ears 27 and the edge 29 are slotted vertically to receive the side frames 19 and 21.

Mounted on the bottom of the support plate 23 by means of projections 31 which enter openings and are staked or otherwise fixed in plate 23, are a pair of spacer strips 33 which are similarly staked into a lower plate 35.

Each of the keys 9 is provided with a stem 37 which projects through both plates 23 and 35 and is guided therein. The stems are preferably of rectangular cross section so that they cannot turn in the plates.

Figure 8:
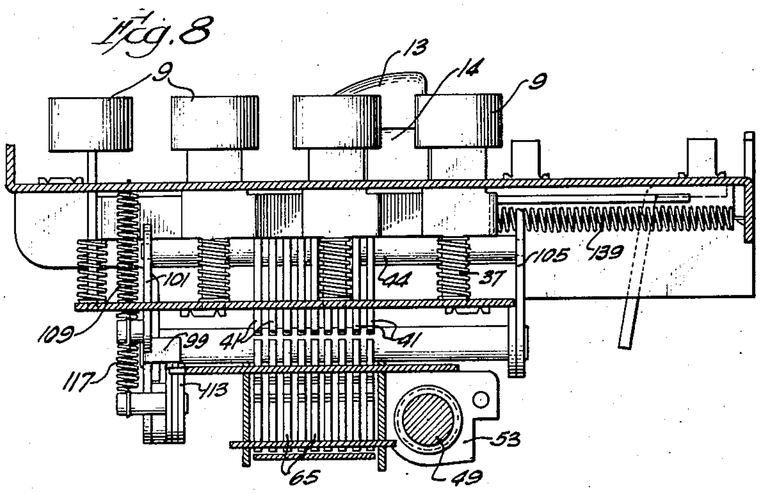
Figure 8 is an elevation partly in section of the keyboard superposed on the selector mechanism.

Each key stem is provided with a laterally extending projection 39. The projections have various conformations, as are shown in dotted lines in Fig. 2, and each projection terminates in a downwardly directed push rod 41 (Fig. 3) which passes through the lower plate 35. The push rods are all aligned fore and aft of the keyboard as is clearly shown in Figs. 8 and 9.

Retrieving springs 43 surround the key stems 37 and bear on the lower plate 35 and the under side of the projections to hold the keys in the upper position.

The lateral projections 39 of the keys 9 which are numbered 0, 1, 3, 4, 6, 7 and 9 are extended so as to overlie a carriage shifting bar 44, while the stems of the keys numbered 2, 5 and 8 carry special projections 45 which extend over the bar.

It should also be noted that the stem 37 of the key numbered 9 is not provided with a push rod 41 for the reason that the full stroke of the control rack is utilized and that a permanent stop is provided for limiting this stroke. The key therefore merely operates the shift bar.

An L-shaped guide rail 47 is fixed between the side frames 19 and 21 and a round guide bar 49 is similarly supported. A carriage (Figs. 3, 5, 6 and 7) is made up of a top plate 51 to which are staked end plates 53. The latter project beyond the top plate and have fixed to them, bearings 55 which ride on the bar 49. The plate 51 has a projection 57 which is provided on its edge with a series of teeth 59 and which extends over the rail 47. While nine teeth are shown in the escapement rack, all are not utilized in the machine.

The carriage also comprises side plates 61 staked in place on the top and end plates and a bottom plate 63 similarly staked to the side plates and one end plate. The bottom plate extends only partially across the carriage from the right end to approximately the center (see also Figs. 10 and 11).

Mounted for vertical displacement in the top and bottom plates are a plurality of stops 65. The stops are of rectangular cross section and have upper and lower abutments 67 and 69 for contact with the plates to define the actuated or retracted positions of the stops, and upper and lower notches 71 and 73 which are adapted to receive spring detents 75 to hold them in one or the other of said positions.

The stops are arranged in eight vertical rows of nine stops each. Only three vertical rows are used, however, in the present machine.

Pivotally mounted on the side plate 61 adjacent rod 49 (see Fig. 11) is a locking plate 77. An ear 79 thereon hooks over bottom plate 63 to limit the downward pivoting induced by spring 72 which is fixed at one end to the lower side plate 61 and to an upturned ear 74 on plate 77. One edge 81 of the plate 77 is bent downwardly, as shown particularly in Figures 3 and 6, to serve as a lock for the rack members to be described.

A link 83 is pivoted on stud 85 fixed in the top plate 51 and is pivotably connected at 87 to the manual reset lever 89. The power reset lever 91 bears against the left end plate 53.

As will be seen in Figure 3, a stop resetting plate 93 is fixed to side frame 19 and underlies the stops 65. The left-hand end 95 is bent downwardly and serves as a cam for lifting any stops which have been actuated upon resetting of the carraige, as will be described.

*Carriage spacing*

A spring 97 (Fig. 5) has one end attached to the right hand carriage end plate 53 and the other to the side frame 21. The spring continually urges the carriage to the left. This action is prevented by the escapement mechanism which comprises pawl 99 which is fixed on the escapement lever 101 and pawl 113. The lever 101 is fixed to one end of shaft 103 which carries a lever 105 at its other end. The levers support the carriage shifting bar 44 between them. The shaft 103 is carried in a bracket 107 which is fixed to the left spacer strip 33 (see Figs. 2, 3 and 9).

A spring 109 is hooked on a stud 111 on lever 101 at one end and on the plate 23 at the other to normally hold the lever and bar 44 in the counterclockwise position (Fig. 3) which is determined by the contact of bar 44 with the actuating projections on the key stems.

The loose escapement pawl 113 is pivotally mounted at 115 on the lever 101 and is rotated counterclockwise (Fig. 3) into contact with pawl 99 by spring 117. The point of the loose pawl extends upwardly beyond the lower edge of the pawl 99 and to the right thereof. In the normal position the pawl 113 engages a tooth 59. As the bar 44 and associated mechanism is depressed pawl 113 releases the tooth 59 of the rack which lies against it, but before this occurs pawl 99 has moved into position to block the released tooth. There is a slight motion of the carriage to the left (Fig. 3) as the tooth passes the point of pawl 113 which will now bear upon the under side of the tooth. As the bar 44 returns to normal, pawl 99 lifts but pawl 113 is held by the tooth and spring 117 is tensioned. As pawl 99 releases the tooth the carriage moves leftward and as the space between the released tooth and the following tooth moves over pawl 113, the latter is snapped upwardly and engages the following tooth to stop the carriage.

At the end of the movement of the carriage, the actuated stop 65 will be positioned in alignment with the first rack bar 119. If a second key is actuated, the second stop set up in the second vertical row of stops will be in alignment with rack bar 119; while the first set stop, being in the first vertical row, will have been moved into alignment with rack bar 121. A third stop, which will be in the third vertical row, may be set. In this case, the first stop becomes ineffective since it moves out of alignment with rack bar 121, the second set stop moves into alignment therewith while the third set stop moves into alignment with rack 119.

*Carriage resetting*

The carriage may be reset manually in the event of an error or automatically at the end of a cycle.

Figure 9:
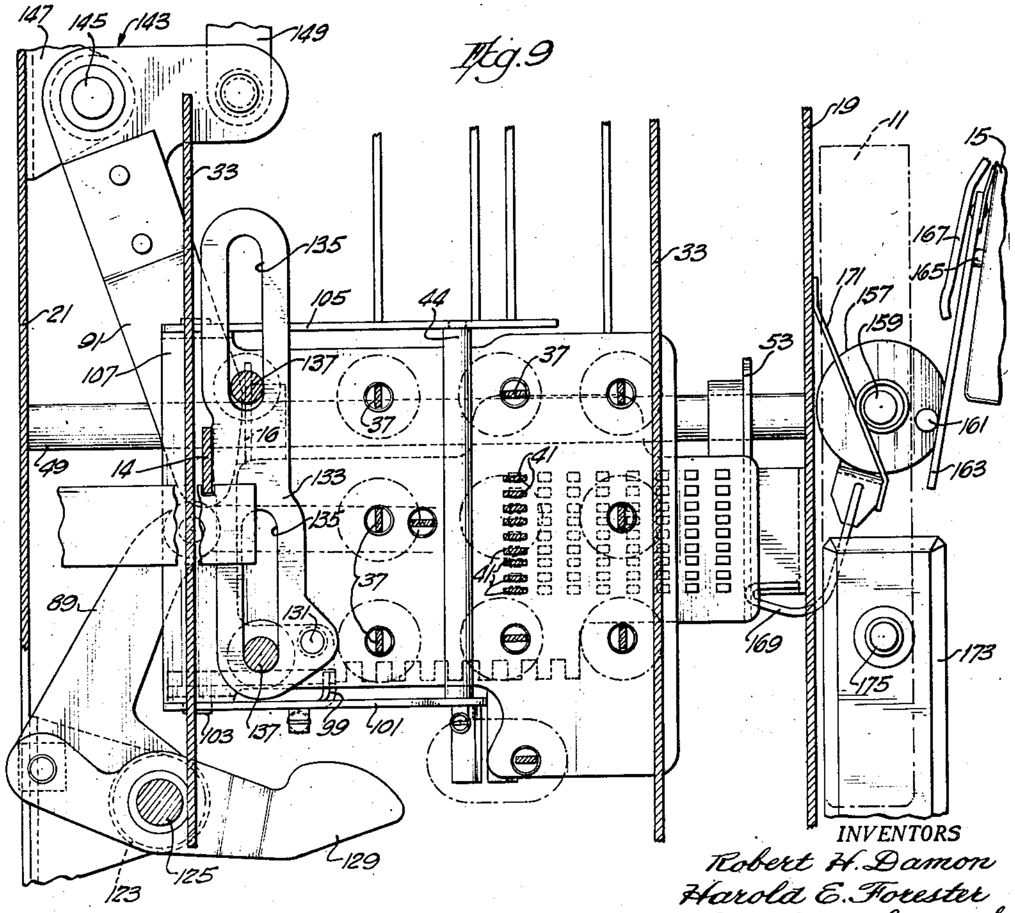
Figure 9 is a sectional view taken substantially on line 9—9 of Figure 3 showing the relative position of the selector mechanism and the actuator set up by the keyboard and also showing the motor controls and reset.

Mention has already been made of the link 83 and the resetting lever 89. As shown in Figs. 2, 3 and 9, lever 89 is mounted on the lower end of hub 123, and the hub is pivotally mounted on a stud 125 which is fixed in the support plate 23 at one end and at the other end in a bracket 127 fixed to side frame 21. A second lever 129 is fixed to the upper end of the hub and extends across the front of the machine in the path of a pin 131 carried by a resetting slide 133 which moves substantially at right angles to the lever. The slide 133 is provided with elongated slots 135 through which pass headed pins 137 which enter the support 23. The lever 14 is formed as a part of the slide and is bent upwardly to pass through slot 16 in the plate 23. A spring 139 is connected at one end to post 141 on the slide and at the other to 29 (Fig. 2).

Pulling the key 13 downwardly will move the slide in the same direction against the action of spring 139 until pin 131 contacts lever 129 which will rotate clockwise (Fig. 2) and turn hub 123 and lever 89 in the same direction. The lever 89 through link 83 restores the carriage to its right-hand position.

Figures 12, 29, 30, 31:
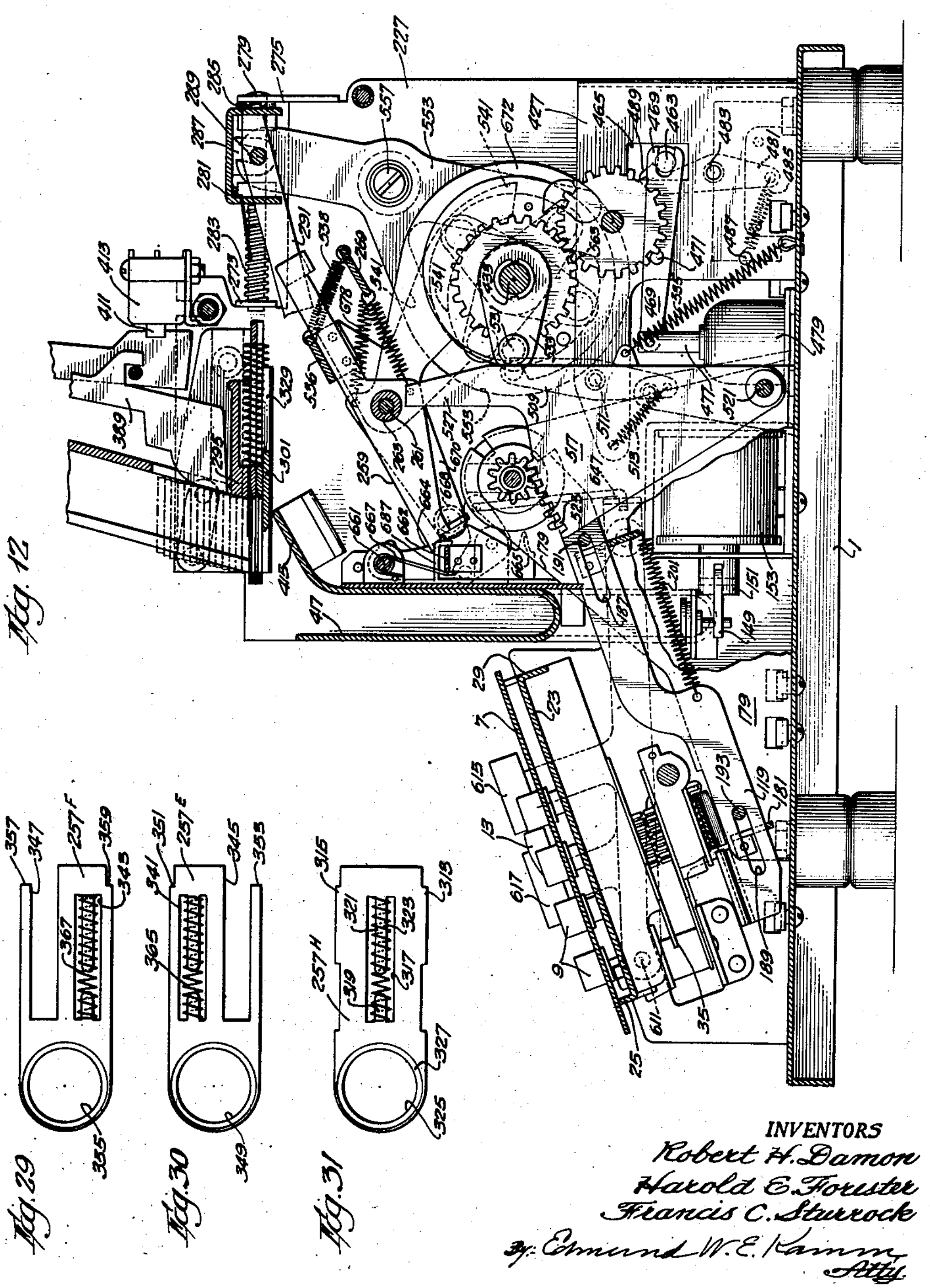
Figure 12 is an elevation of the entire apparatus, with the housing removed, showing the parts in the initial or normal position.
Figure 29 is a plan view of the upper ejector slide of a two slide magazine.
Figure 30 is a plan view of the lower ejector slide of a two slide magazine.
Figure 31 is a plan view of the single ejector slide of a one slide magazine.

The same result is attained by the bell crank 143 (Figs. 5, 9, 12 and 13) which is pivoted at 145 to a bracket 147 mounted on the frame 21. One arm of the lever is connected by a link 149 to the armature 151 of a solenoid 153 (Fig. 12). The other arm 91 is formed of two spaced identical parts which straddle the guide rod 49 and abut the carriage end piece 53 on the left side.

Upon energization of the solenoid, the armature is retracted and the bell crank is rotated counterclockwise to restore the carriage to the right (Fig. 9). The carriage is moved far enough so that the last tooth 59 of the escapement rack passes a considerable distance beyond the pawl 113. When the resetting action terminates, the carriage spring returns the carriage to the left until the first tooth contacts the pawl 113 and positions the stops 65 under the key stems 41, as is shown clearly in Fig. 3.

Figure 4:
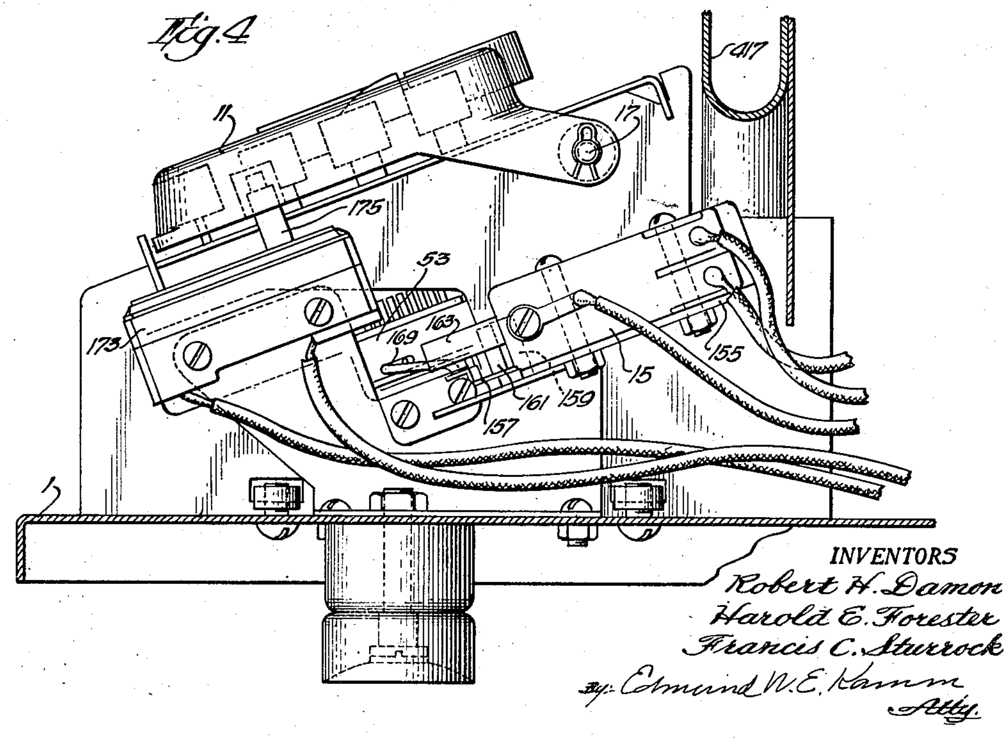
Figure 4 is a side view of the keyboard, viewed from the right of Figure 2, showing the motor control switches.
Figure 5:
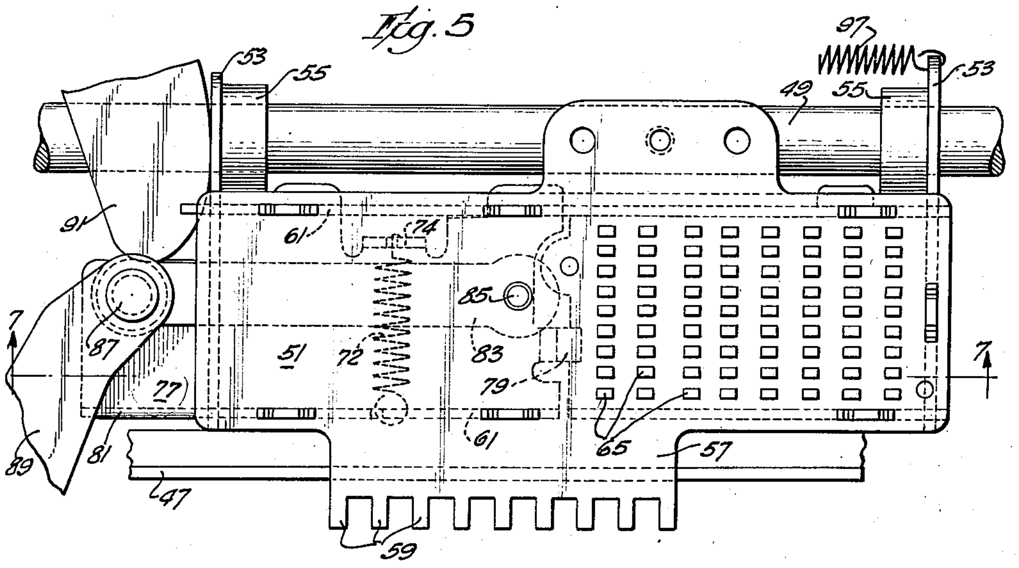
Figure 5 is a top view of the selector mechanism and stop carriage with the keyboard removed.
Figure 6:
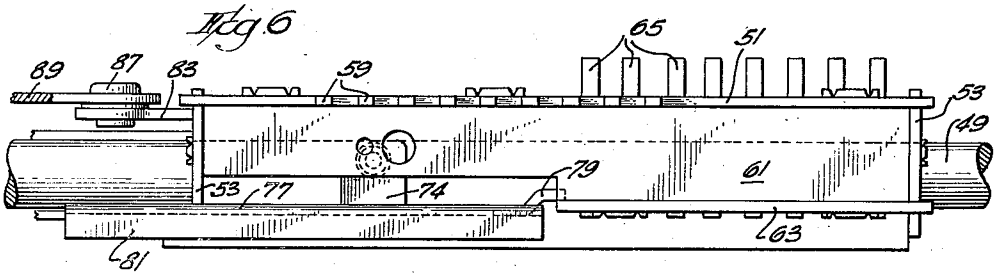
Figure 6 is a side elevation taken from the bottom of Figure 2 of the selector mechanism.
Figure 7:
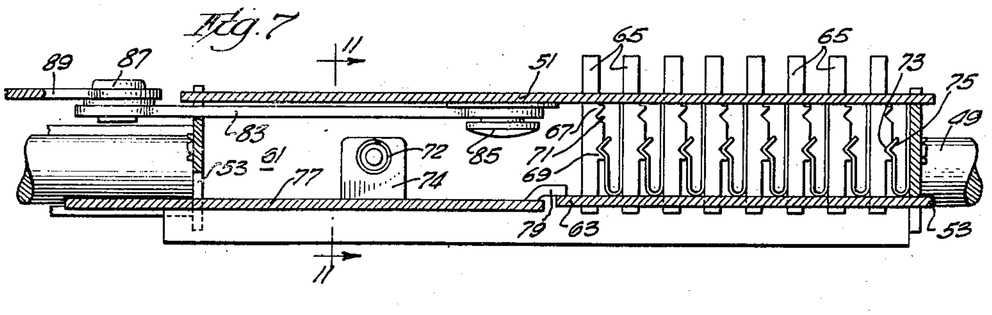
Figure 7 is a sectional view of the mechanism of Figure 5 taken substantially on the line 7—7 thereof.

The overtravel just described serves to open the normally closed release switch 15 (Figs. 1, 4 and 9) which is mounted on an ear 155 bent outwardly from side frame 19 (Fig. 4). A disk 157 (Figs. 4 and 9) is rotatably mounted on a stud 159 which extends upwardly from the ear 155. The disk carries an upstanding pin 161 which is adapted to operate the switch lever 163 and depress the button 165 to open the switch. Stop 167 limits the reverse movement of the lever 163. An arm 169 is fixed to the disk and bears on the end plate 53 of the carriage. A spring 171 is hooked around stud 159 and bears at one end against the side frame 19 and at the other on the lever 169. Thus when the carriage is in the normal position, as shown in Figure 9, the switch is open as it is during the overtravel of the carriage to the right of the position shown since in both positions sufficient rotation of disk 157 and pin 165 is provided to rotate lever 163 counterclockwise to open the switch. However, when a key is operated, the carriage travels away from arm 169 and switch 15 is closed to condition switch 173 for operation, as will later be described.

*Starter switch*

Also mounted on the side frame 19 is the starter switch 173 (see Figs. 4 and 9). The switch is normally open and has one actuating button 175 which is disposed under the motor bar 11. Closure of the switch starts the cycling of the machine if switch 15 has been previously closed.

*Control rack and associated structure*

As previously set forth, the stroke of the rack bars 119 and 121 is determined by the stops 65 to attain the desired result. These rack bars and associated structure are detailed in Figures 3, 12, 13, 14, 18, 26, 33, 34, 35, 36 and 38.

Referring first to Figures 3, 12, 13, 14, 26, 33, 34 and 35, the numerals 177 and 179 represent the side pieces of a guide frame which are fixed to the base 1 in vertical relation thereto. At the forward or keyboard end, a guide member 181 connects the side pieces and is provided with two upwardly open notches 183 and 185 adapted to slidingly receive the racks 119 and 121 respectively.

The rack bar 119 (Figs. 12, 13 and 14) is provided with slots 187 and 189 which receive support bars 191 and 193 respectively, while rack 121 contains similar slots 195 and 197. A second slotted guide member 199 extends between the side pieces 177 and 179 and spring 201 is connected at one end to the member 199 and at the other end to bar 119 while spring 203 is similarly connected to the member and bar 121.

It is noted that each rack bar 119 and 121 is provided with an ear or flange 120 and 122 respectively (Figs. 26, 33 and 34), and also each bar is cut away at 124 and 126 (Fig. 14) so that the flange will be in a position to contact any stop 65 which may be depressed and which is in alignment with it. However, when the carriage is in its normal position, the edge 81 of locking plate 77 is adapted to block the flanges and prevent movement of either of the bars (see Fig. 3). As the carriage shifts one step to the left, the edge unlocks first bar 119, and upon the next step unlocks bar 121 (see Figs. 26, 33 and 34). The rods 191 and 193 acting in the slots 187, 195, 189 and 197 determine the full stroke travel of the bars.

Figures 14, 33, 34, 35:
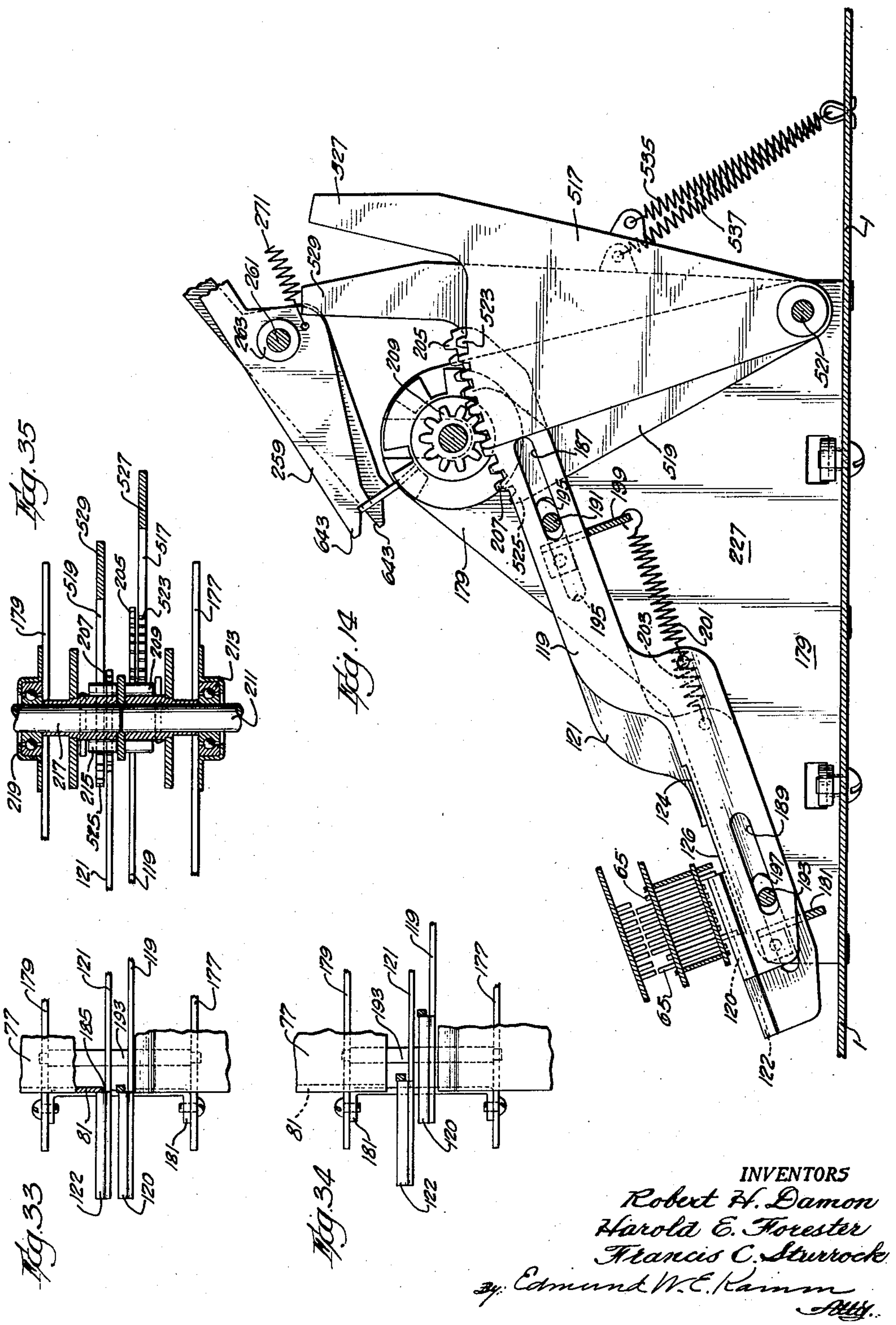
Figure 14 is a view of the selector mechanism, the control racks, cam shafts and connecting means with the units mechanism in one of its actuated positions.
Figure 33 is a plan view of the control bars, the tens bar in normal or retracted position and the units bar in position against the zero stop.
Figure 34 is a plan view of the bars of Figure 33 in actuated position against other selector stops.
Figure 35 is a sectional view showing the drive connection between the control bars and the cam shafts.

Each of the bars 119 and 121 is offset near the center and carries a rack at the end remote from the keyboard, the racks being designated 205 and 207 respectively (Fig. 14). The rack 205 (Fig. 35) meshes with a gear 209 which is fixed to the end of a cam shaft 211 which passes through a ball bearing 213 attached to the side piece 177.

Figure 18:
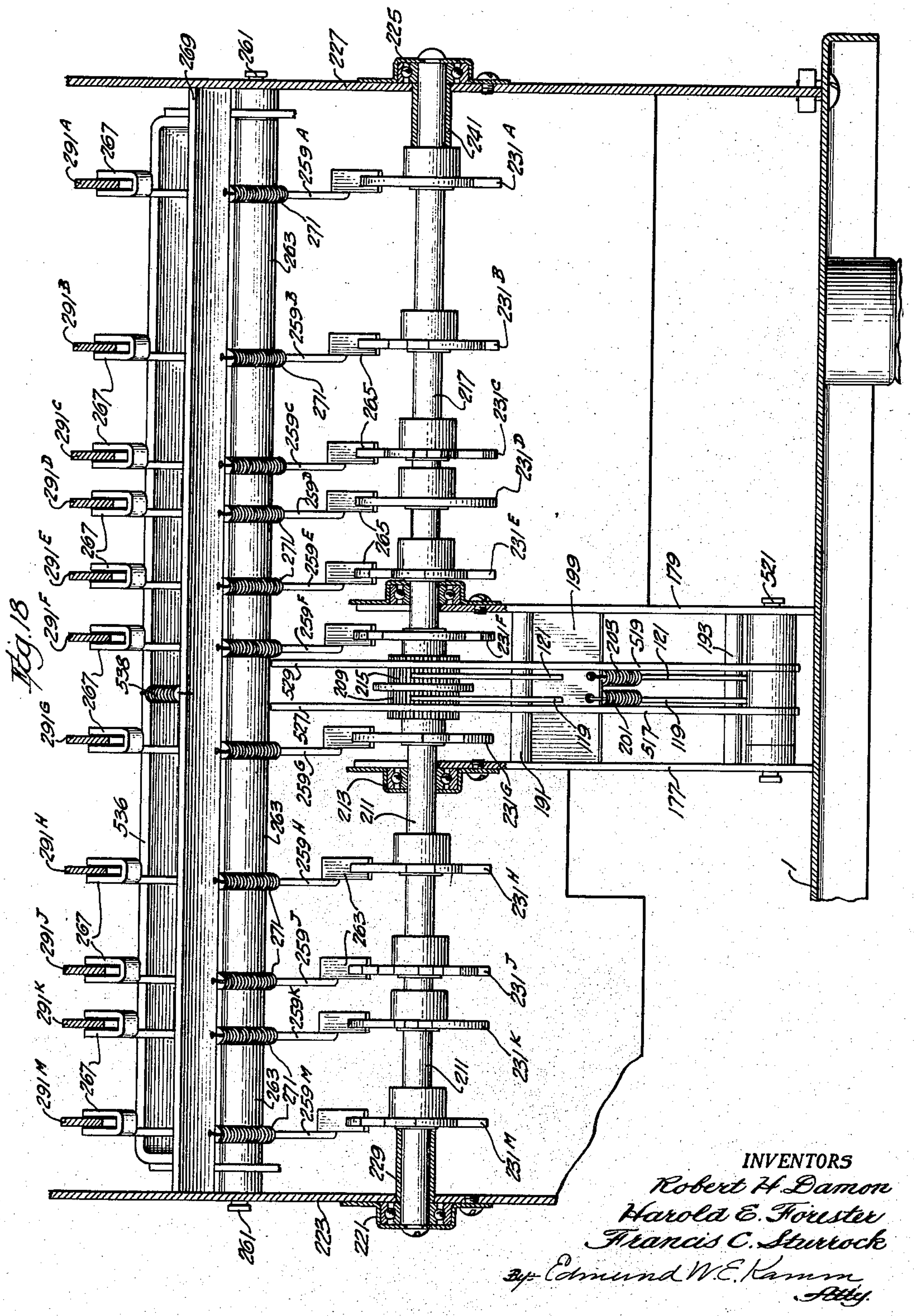
Figure 18 is a rear view of the selector cams, cam followers and the ejector actuating interponents.
Figure 36:
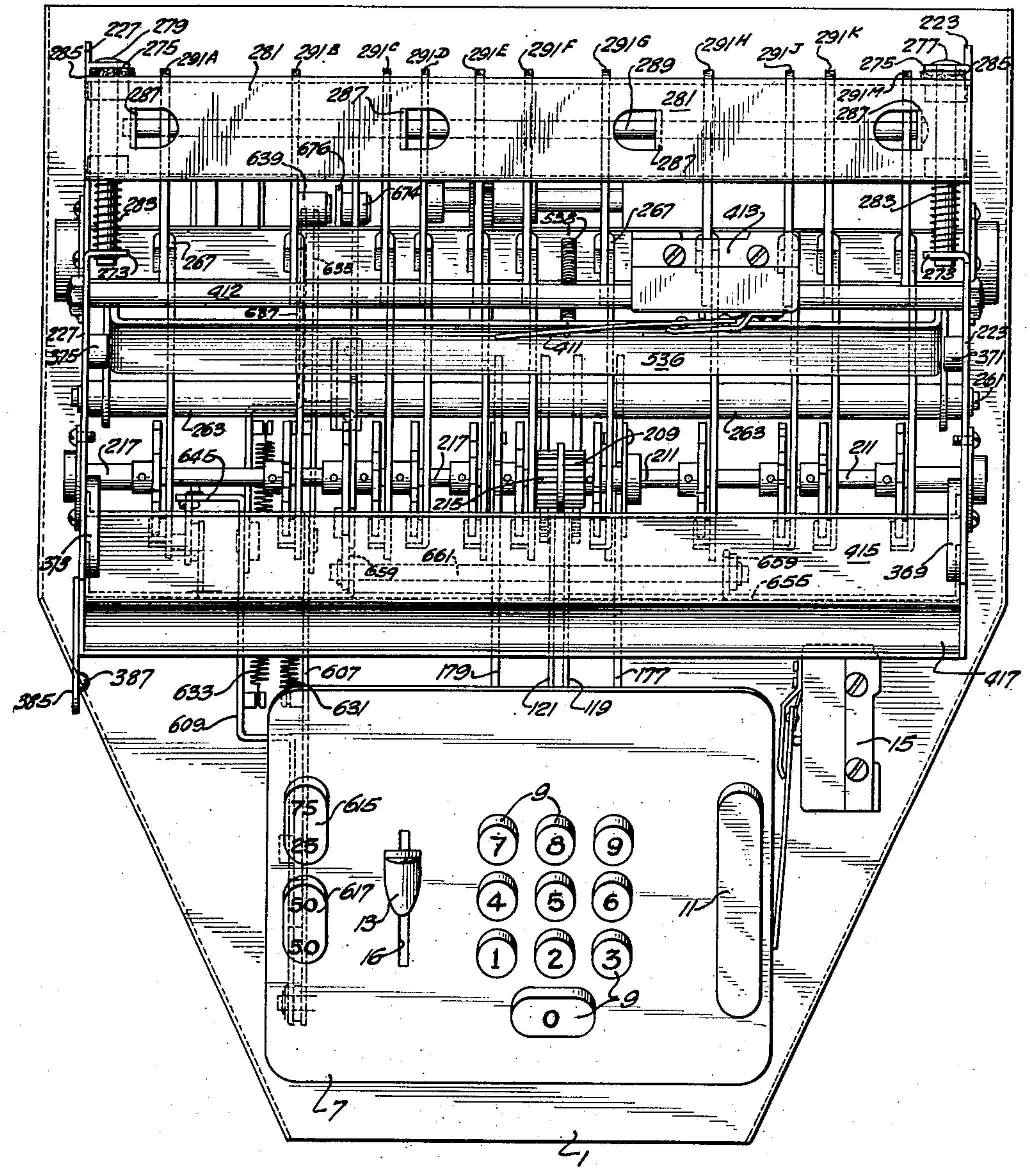
Figure 36 is a top view of the changer machine with the cover removed.
Figure 38:
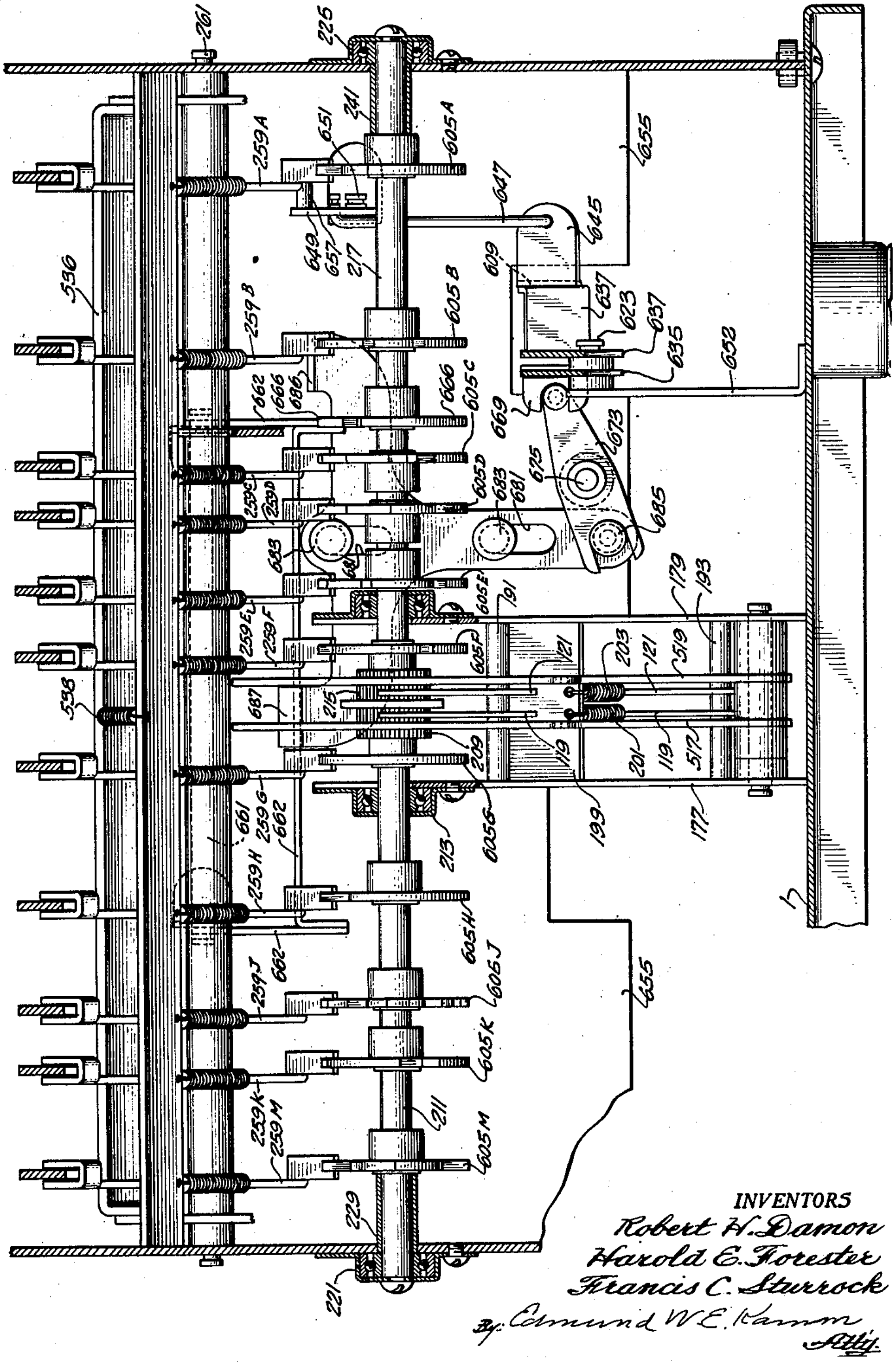
Figure 38 is a rear elevation of the changer machine showing the holding mechanism and the cam shafts.

Rack 207 meshes with a gear 215 which is fixed to one end of a cam shaft 217 which is in turn mounted in a ball bearing 219 attached to the side plate 179 (see also Figs. 18, 36 and 38).

The outer end of the shaft 211 is supported in a ball bearing 221 (Fig. 18) mounted on the main side frame 223 which is, in turn, fixed to the base 1; while the outer end of shaft 217 is mounted in a ball bearing 225 fixed to main side frame 227 also fixedly supported by the base.

Shaft 211 carries a spacer 229 adjacent to its outer end and has fixedly mounted upon it at spaced intervals the selector cams 231-M, 231-K, 231-J, 231-H, and 231-G. Shaft 217 similarly carries the spacer 241 and cams 231–A, 231–B, 231–C, 231–D, 231–E and 231–F.

It will thus be seen that each of the bars 119 and 121 will stop its associated gear, cam shaft and cams in any one of ten rotative positions, depending upon which stop 65 is set up. When any of the number keys from zero to nine are pressed singly, the bar 119 will permit movement of the associated parts through arcs having a length proportionate to the value of the key. If any of the number keys are pressed as just described, and thereafter another key is depressed, the stop 65 first set up will be moved with the carriage into the path of bar 121 and will control it as stated, while the second set stop 65 will control rack bar 119 in accordance with the key pressed. Thus if keys 8 and 5 are pressed successively, rack bar 121 and its associated parts will be permitted to advance 8 units while rack bar 121 and its cams, etc., will advance 5 units. Should a third key be depressed, the carriage will again space and the first set stop will be moved out of alignment with bar 121 and will be ineffective while the second set stop moves into alignment with bar 121 and the third set stop in alignment with rack 119.

*Cam mechanism*

With this explanation it is believed to be advisable to describe the cams and their relative arrangements on the shafts before going into the actuating mechanism by which the various functions are effected.

Before discussing the cam profiles, it will be well to outline the plan of operation of the machine. Since it is necessary to issue any amount desired from one cent to one dollar in increments of one cent, it is obvious that one hundred individual or combined cam combinations are required.

Eight tubes or magazines are provided as follows: 255–A, 255–B, 255–CD, 255–EF, 255–G, 255–H, 255–JK and 255–M. Tube 255–A is provided with a single ejector 257–A; tube 255–B has one ejector 257–B; tube 255–CD is provided with two ejectors 257–C and 257–D; tube 255–EF is also provided with two ejectors 257–E and F; tube 255–G has one ejector 257–G; tube 255–H has one ejector 257–H; tube 255–JK has two ejectors 257–J and 257–K; while tube 255–M has one ejector 257–M. Each ejector serves to eject one coin, with the exception of 257–M, which ejects two.

The tube 255–A contains half dollars; 255–B contains quarters; 255–CD dimes, 255–EF, G and H nickles and 255–JK and M pennies.

The plan of operation of the machine is disclosed in the attached chart in which, for simplicity, the eleven different slides 257 are indicated merely by letter in the first line of the heading. The eight coin tubes from which the coins are ejected are indicated by the upper row of horizontal spaces and the value of the coins ejected by each slide is shown in the circle below the letter indicating the ejector. The numbers on the left of each chart indicate the total value of the coins to be issued while the letters in the horizontal rows indicate the ejectors which are operated in unison to obtain the total value indicated. It should be noted that there are eleven ejector slides and eleven selector cams. The ejectors A to F inclusive correspond to cams 231–A, B, C, D, E and F respectively, while slides G, H, J, K and M correspond to cams 231–G, H, J, K and M; and as indicated previously, the ejectors A to F correspond to the tens of the sum to be ejected, hence to the stop 65 first set up, while the cams G to M correspond to the units of the sum to be ejected and hence to the second set stop 65.

It will be seen that there are eleven positions for the rack bars, namely, returned position, nine stop positions and full stroke position. There are eleven similar positions for the cams indicated by the letter R, numerals 0 to 8, and numeral 9 respectively, in Figure 25. The cams are rotated 180 degrees from rest to full stroke position and, therefore, the indentations on the cams may be spaced apart slightly more than 16 degrees.

Figure 25:
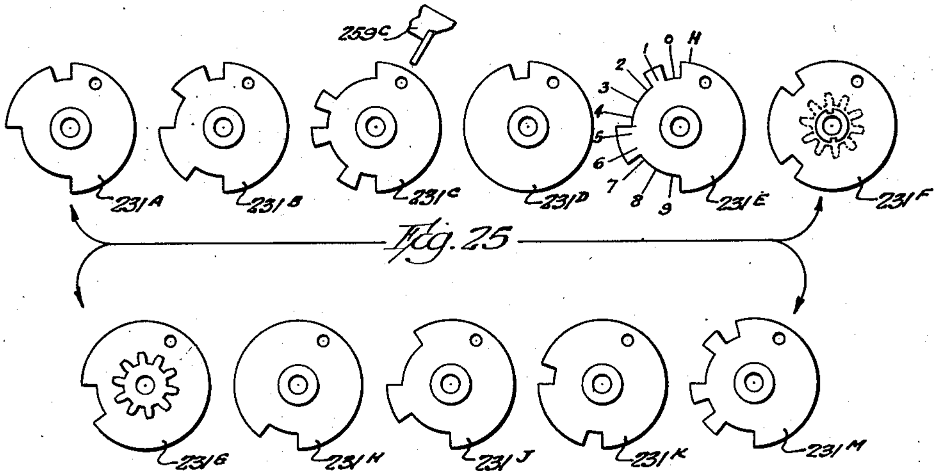
Figure 25 is a side elevation of the cams utilized in the payer to select the interponents to be operated, the top row group of five representing the tens cams mounted on the left of the machine when viewed from the front and the lower row group of six representing the units cams mounted on the right of the machine.

Now considering Chart A in connection with the cams shown in Figure 25, it will be seen that the cam followers 259 are positioned slightly (about 8°) to the right of the vertical center line

CHART A

| | | TENS | | | | | | UNITS | | | | |
|---|---|---|---|---|---|---|---|---|---|---|---|---|
| | | A (50) | B (25) | C (10) | D (10) | E (5) | F (5) | G (5) | H (5) | J (1) | K (1) | M (2) |
| 100 | | A | B | C | D | E | | | | | | |
| | | | | | | | | | | | | |
| 1 | | | | | | | | | | J | | |
| 2 | | | | | | | | | | | | M |
| 3 | | | | | | | | | | J | | M |
| 4 | | | | | | | | | | J | K | M |
| 5 | | | | | | | | G | | | | |
| 6 | | | | | | | | G | | J | | |
| 7 | | | | | | | | | H | | | M |
| 8 | | | | | | | | | H | J | | M |
| 9 | | | | | | | | | H | J | K | M |
| 10 | | | | C | | | | | | | | |
| 11 | | | | C | | | | | | J | | |
| 12 | | | | C | | | | | | | | M |
| 13 | | | | C | | | | | | J | | M |
| 14 | | | | C | | | | | | J | K | M |
| 15 | | | | C | | | | G | | | | |
| 16 | | | | C | | | | G | | J | | |
| 17 | | | | C | | | | | H | | | M |
| 18 | | | | C | | | | | H | J | | M |
| 19 | | | | C | | | | | H | J | K | M |
| 20 | | | | C | | E | F | | | | | |
| 21 | | | | C | | E | F | | | J | | |
| 22 | | | | C | | E | F | | | | | M |
| 23 | | | | C | | E | F | | | J | | M |
| 24 | | | | C | | E | F | | | J | K | M |
| 25 | | | | C | | E | F | G | | | | |
| 26 | | | | C | | E | F | G | | J | | |
| 27 | | | | C | | E | F | | H | | | M |
| 28 | | | | C | | E | F | | H | J | | M |
| 29 | | | | C | | E | F | | H | J | K | M |
| 30 | | | B | | | E | | | | | | |
| 31 | | | B | | | E | | | | J | | |
| 32 | | | B | | | E | | | | | | M |
| 33 | | | B | | | E | | | | J | | M |

| | TENS | | | | | | UNITS | | | | |
|---|---|---|---|---|---|---|---|---|---|---|---|
| | A (50) | B (25) | C (10) | D (10) | E (5) | F (5) | G (5) | H (5) | J (1) | K (1) | M (2) |
| 34 | | B | | | E | | | | J | K | M |
| 35 | | B | | | E | | G | | | | |
| 36 | | B | | | E | | G | | J | | |
| 37 | | B | | | E | | | H | | | M |
| 38 | | B | | | E | | | H | J | | M |
| 39 | | B | | | E | | | H | J | K | M |
| 40 | | B | C | | E | | | | | | |
| 41 | | B | C | | E | | | | J | | |
| 42 | | B | C | | E | | | | | | M |
| 43 | | B | C | | E | | | | J | | M |
| 44 | | B | C | | E | | | | J | K | M |
| 45 | | B | C | | E | | G | | | | |
| 46 | | B | C | | E | | G | | J | | |
| 47 | | B | C | | E | | | H | | | M |
| 48 | | B | C | | E | | | H | J | | M |
| 49 | | B | C | | E | | | H | J | K | M |
| 50 | A | | | | | | | | | | |
| 51 | A | | | | | | | | J | | |
| 52 | A | | | | | | | | | | M |
| 53 | A | | | | | | | | J | | M |
| 54 | A | | | | | | | | J | K | M |
| 55 | A | | | | | | G | | | | |
| 56 | A | | | | | | G | | J | | |
| 57 | A | | | | | | | H | | | M |
| 58 | A | | | | | | | H | J | | M |
| 59 | A | | | | | | | H | J | K | M |
| 60 | A | | C | | | | | | | | |
| 61 | A | | C | | | | | | J | | |
| 62 | A | | C | | | | | | | | M |
| 63 | A | | C | | | | | | J | | M |
| 64 | A | | C | | | | | | J | K | M |
| 65 | A | | C | | | | G | | | | |
| 66 | A | | C | | | | G | | J | | |

PAYER 7 8 9
4 5 6
1 2 3
100

Figures 13, 32:
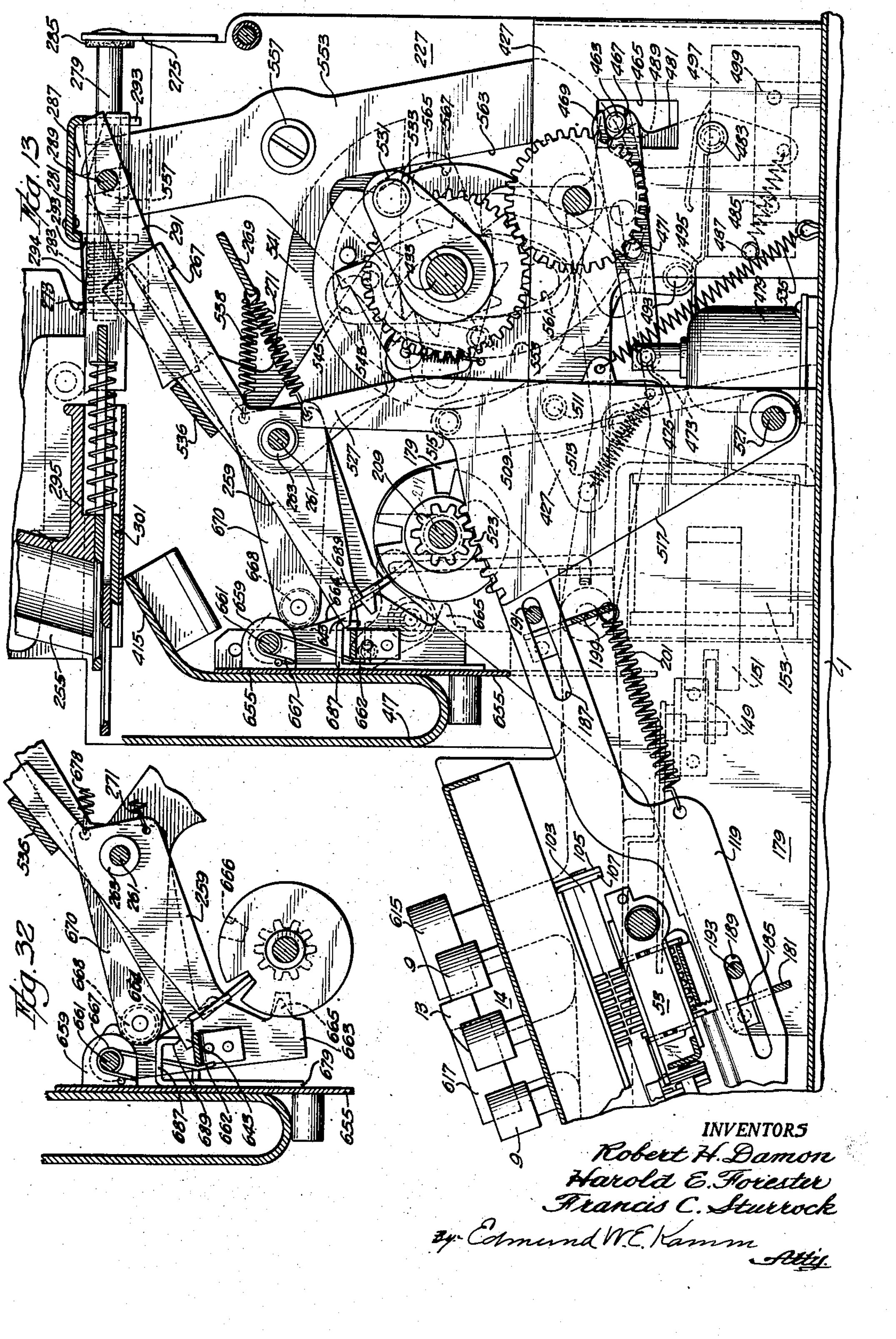
Figure 13 is an enlarged view similar to Figure 12 but showing the coin ejection means in their operated positions.
Figure 32 is a sectional view of the cam followers and a part of the withholding mechanism of the changer.

| | TENS | | | | | | UNITS | | | | |
|---|---|---|---|---|---|---|---|---|---|---|---|
| | A (50) | B (25) | C (10) | D (10) | E (5) | F (5) | G (5) | H (5) | J (1) | K (1) | M (2) |
| 67 | A | | C | | | | | H | | | M |
| 68 | A | | C | | | | | H | J | | M |
| 69 | A | | C | | | | | H | J | K | M |
| 70 | A | | C | | E | F | | | | | |
| 71 | A | | C | | E | F | | | J | | |
| 72 | A | | C | | E | F | | | | | M |
| 73 | A | | C | | E | F | | | J | | M |
| 74 | A | | C | | E | F | | | J | K | M |
| 75 | A | | C | | E | F | G | | | | |
| 76 | A | | C | | E | F | G | | J | | |
| 77 | A | | C | | E | F | | H | | | M |
| 78 | A | | C | | E | F | | H | J | | M |
| 79 | A | | C | | E | F | | H | J | K | M |
| 80 | A | B | | | E | | | | | | |
| 81 | A | B | | | E | | | | J | | |
| 82 | A | B | | | E | | | | | | M |
| 83 | A | B | | | E | | | | J | | M |
| 84 | A | B | | | E | | | | J | K | M |
| 85 | A | B | | | E | | G | | | | |
| 86 | A | B | | | E | | G | | J | | |
| 87 | A | B | | | E | | | H | | | M |
| 88 | A | B | | | E | | | H | J | | M |
| 89 | A | B | | | E | | | H | J | K | M |
| 90 | A | B | C | | E | | | | | | |
| 91 | A | B | C | | E | | | | J | | |
| 92 | A | B | C | | E | | | | | | M |
| 93 | A | B | C | | E | | | | J | | M |
| 94 | A | B | C | | E | | | | J | K | M |
| 95 | A | B | C | | E | | G | | | | |
| 96 | A | B | C | | E | | G | | J | | |
| 97 | A | B | C | | E | | | H | | | M |
| 98 | A | B | C | | E | | | H | J | | M |
| 99 | A | B | C | | E | | | H | J | K | M |

of the cam (see also Figs. 12 and 13). To issue a dollar in change, three keys 1, 0 and 0 are struck in succession. The effect of this is to establish the zero stops in the units and tens columns in stopping position with respect to the rack bars 119 and 121. The first set stop (which was the stop 65, second from the bottom, in the first or left-hand vertical row, Fig. 5) was moved out of effective relation with the rack bars on the last carriage shift so the effect is the same as if the zero key had been twice punched. The lowermost stop in the second and third vertical rows (from the left) are set.

From the chart it will be seen that to issue a dollar in change, a half, quarter, two dimes and one nickel must be ejected. This requires the operation of slides 257-A, B, C, D and E as shown by the chart. Accordingly, notches in cams 231-A, B, C, D and E must be moved in alignment with followers 259-A, B, C, D and E upon movement of the rack bars from the returned to the first or zero stop position. That this occurs can be seen by inspection of Fig. 25. All of the other cams present their full outside diameters to their followers and, therefore, the latter are not actuated.

By way of further example, if it is desired to issue 51 cents, it will be determined by the chart that a half dollar and penny will be issued and that therefore the slides 257-A and 257-J must be actuated. Therefore, a notch must be provided in cam 231-A at the sixth position, corresponding to key numbered 5, and a notch must be provided in cam 231-J, at the second position, corresponding to key numbered 1.

Thus, generally speaking, the ejectors to be operated for any amount are determined from the chart and the location of the required notches in the corresponding cams is determined, first, by whether the individual cam is actuated in response to the tens rack bar 121 or the units rack bar 119 and, second, by the amount of travel of such bar, which travel corresponds to the number plus one, of the key which has been actuated, that is, six units of travel for the number 5 key and two units for the number 1 key.

An examination of the chart indicates that it is frequently necessary to actuate both of the ejectors on the EF and JK tubes. The D tube is used only in one case, namely, in issuing change for a dollar.

*Cam follower and associated structure*

Referring to Figures 12, 13, 14, 15, 18, 32 and 36, and particularly to Figures 15, 18, 32 and 36, each of the followers 259-A, B, C, D, E, F, G, H, J, K and M is formed as a lever which is pivotally mounted on a rod 261 mounted in the main side plates 223—227. The levers are separated by spacers 263. The lower end of each lever has an ear 265 which is bent to extend at right angles to the lever and projects downwardly therefrom so as to ride on its corresponding cam. The upper end of each lever is formed with an offset, U-shaped cradle or clevis 267.

A spring anchor bar 269 extends between and is supported on the main side plates 223—227 and springs 271, one for each follower, are attached at one end to the bar and at the other to the follower so as to rotate each of the levers counterclockwise (Fig. 32) into contact with the associated cam.

Mounted horizontally between ears 273 and 275 on each of the main side frames 223 and 227 are parallel guide rods 277 and 279. A U-shaped carriage 281 is mounted to slide sidewise on the rods 277 and 279. A spring 283 surrounds each rod and bears against the carriage to hold it normally in its rearmost position against a leather washer 285 which is mounted between the ear 275 and the carriage and is, of course, held against the ear by the carriage.

A plurality of ears 287 (Fig. 13) depend from the carriage and receive a rod 289. A plurality of interponent levers 291-A, B, C, D, E, F, G, H, J, K and M are pivotally mounted on the rod and in slots 293 formed in the depending sides of the carriage. This is clearly shown in Figures 12, 13, 15, 36 and particularly 37. If desired, a small leaf spring 294 may be fixed on the carriage and bear on the upper edge of the lever to tend to depress it. The free end of each of the levers rides in the cradle of the corresponding cam follower. As the cam follower enters a notch in its associated cam (rotates counterclockwise, Figs. 12 and 13), as described above, the interponent is rotated clockwise to a substantially horizontal position (Fig. 13) in alignment with the corresponding ejector. Upon forward motion of the carriage (leftward in Figs. 12 and 13) the interponent engages the slide and moves it in the same direction to push a coin over the coin chute and let it fall therein. The carriage actuating mechanism will be described below.

*Coin magazines and ejectors*

Reference to Figures 12, 13, 15, 19, 20, 21, 22, 29, 30, 31 and 39 will disclose that the coin magazine comprises a series of eight tubes 255-A, B, CD, EF, G, H, JK and M which are of such diameter as to loosely receive half dollars, quarters, dimes, nickels, nickels, nickels, pennies and pennies respectively. The tubes are all fixed in a base 295 which is cut away in the bottom to form parallel guides 297 and 299 running transversely of the base and spanning a tube (see Fig. 39). In the case of the tube having a single ejector slide, a single spring receiving groove 303 is provided. The base is cut away at the rear as indicated by 305 to permit the ejector slides to extend beyond the case so that they can be operated by the interponents 291. The base is cut away at 307 adjacent the front end to conform with the cross-section of the tube and is slotted at 309 to receive a feeler to be described. The rear ends of the guides are closed by abutments 308 and 311 which limit the return of the slide, such as 257-H (Fig. 31), by engaging the stops 313 and 315 thereon.

Each single slide such as 357-H has a slot 317 which is provided with projections 319 and 321 extending toward each other from the ends of the slot. A spring 323 is mounted on and between the projections in the slot and the left end of the spring rests against the end of groove 303. When the slide is moved to the left (Figs. 31 and 39) the spring is compressed between the left end of the groove in the base and the right end of the slot and, therefore, is enabled to restore the slide to the position determined by the stops 308, 311, 313 and 315 when the interponent is retrieved. The left end of the slide is provided with an opening 325 of a suitable diameter to receive the coin and it is preferably bevelled at 327 to facilitate the entry of the coin into the slide and to prevent the slide from engaging the adjacent coin in the stack.

A guide plate 301 (Figs. 12, 13 and 20) is fixed to the base below the slides to hold them in place and is provided with slots 329 which are in vertical alignment with grooves 303 and the springs to provide adequate clearance therefor. A bottom plate 331 is fixed below the guide plate to confine the springs on the lower side.

Both the guide plate and the bottom plate extend to the rear only as far as the line 305 of the base and toward the front to a point beyond the front face of the magazine so as to support the coins, but they are cut away at 333 and 335 in the region of each tube so that when the slide is fully extended forwardly, the coin may drop freely past both plates. This is clearly shown in Figs. 19, 20 and 23.

Where two slides are required for a single tube, guideways 337 and 339 are provided which are similar to 297 and 299, except that they have twice the vertical depth because they must accommodate two superposed slides such as 257–E and 257–F (see Figs. 19, 20, 21, 29 and 30).

It will be seen from Figs. 29 and 30 that the slides are of the same width but that the spring slot 341 in 257–E is on the opposite side from slot 343 in 257–F, and that clearance slots 345 and 347 are provided in the respective slides to clear the spring of the opposite slide. The coin aperture 349, and stops 351, 353 of 257–E and 355, 357, 359 of 257–F all operate as in the case of the single slide. It should be noted that the slots 345 and 347 also serve to permit passage of the interponent 291 for the other slide.

Since two return springs are required, the base 295 must be provided with two grooves 361 and 363 to accommodate the springs 365 and 367 respectively. The plates 301 and 331 cooperate to support the slides and their springs as in the case of the single slide ejector, plate 301 being slotted adjacent the springs to serve as an abutment for the end of at least the lower spring 365.

*Magazine mounting*

Figures 19, 22, 23:
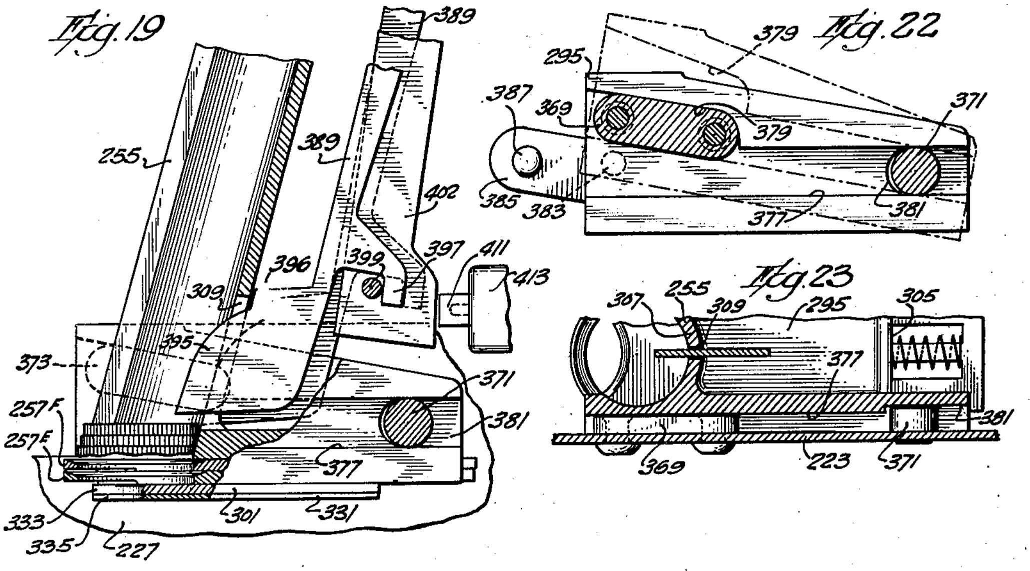
Figure 19 is an end view partly in section showing the coin magazine and the low level pawl, the latter being in the actuated position.
Figure 22 is a view of the mounting lugs and groove for supporting the coin holder on the machine.
Figure 23 is a sectional view of a coin magazine and the low level pawl.

As shown in Figs. 1, 19, 20, 22, 23, 36 and 37, and particularly in Figs. 22, 23 and 36, the inside of the main side frame 223 is provided with an elongated lug 369 and a cylindrical button 371. The longitudinal axis of the lug passes through the center of the button and extends about ten degrees above the horizontal. The width of the lug and the diameter of the button are substantially the same. The inside of the side frame 227 is provided with a similar lug and button 373 and 375 respectively.

The right end of the magazine case is provided with a slot 377 which is wide enough to receive the button 371 at one end and which is cut away at 379 to receive the top portion of the lug 369 so that when the magazine is in its fartherest counterclockwise position the bottom plate 331 and the slides will be substantially horizontal, as shown in full lines in Fig. 22.

Figure 37:
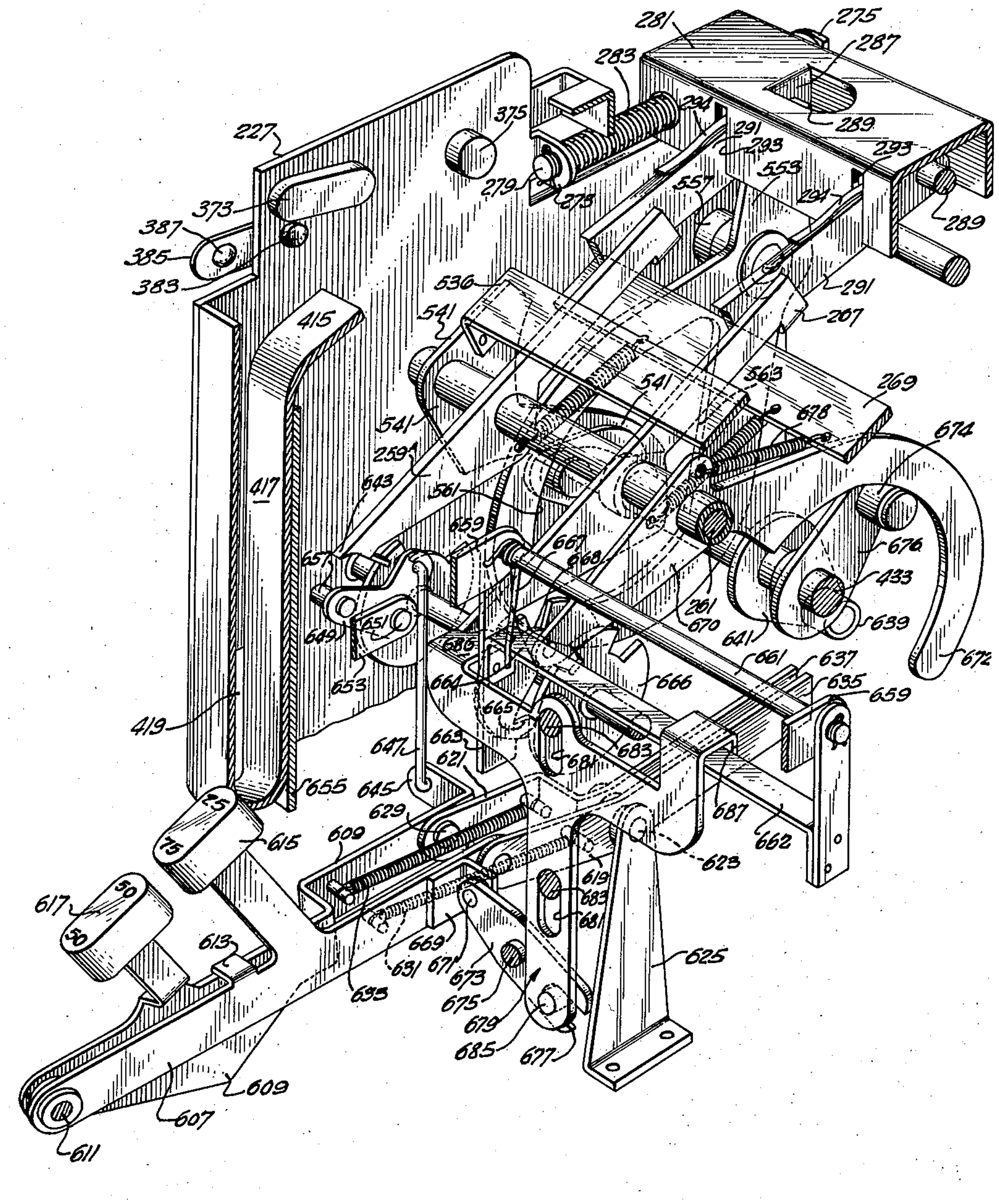
Figure 37 is a perspective view of the holding mechanism of the changer and some of the resetting means.

As clearly appears in Figs. 36 and 37, the button extends farther from the side plate than the lug and, consequently, the rear end of the slot is cut deeper (Fig. 23) at 381 so that it will receive the button and so that the case may pivot on the button between the dotted and full line positions, Fig. 22. Further, the slot and button form a stop to position the magazine relative to the other parts of the mechanism. A similar slot 383 (Fig. 20) is provided in the left end of the base 295 for cooperation with the lug 373 and button 375.

It will be noted that the downward pivoting of the magazine serves to interlock the lug and the abutment formed by the cut away portion 379 of the groove so that the magazine cannot work forwardly in operation.

If desired, locking pin 383, fixed to a spring 385 mounted on the outside of frame member 227 (see Fig. 37), may pass through the member just below the lug 373 so as to prevent the upward tilting of the magazine until the pin is withdrawn manually. If desired, a spherical button 387 may be provided on the outer end of the spring so that pin 383 will be cammed back automatically upon insertion of the magazine.

*Empty magazine control*

Referring to Figs. 15, 19, 20, 21 and 23, it will be seen that each coin tube is provided with a lever 389 which is pivotally mounted upon a rod 391 supported in projections 393 of the magazine. Each lever is provided with a feeler 395 which projects through the slot 309 into the associated tube, with a stop 396 and with a hook 397 which is adapted to engage a bar 399 which is mounted on the rod 391 by means of the center levers 402 and end levers 401. These levers and rod 311 are fixed together to rotate as a unit.

Each of the hooks has a throat which is wide enough to permit the feeler 395 of a lever 389 to enter a tube as far as the stop 396 will permit, as shown in Figure 19, without disturbing any of the other levers.

Figures 20, 21:
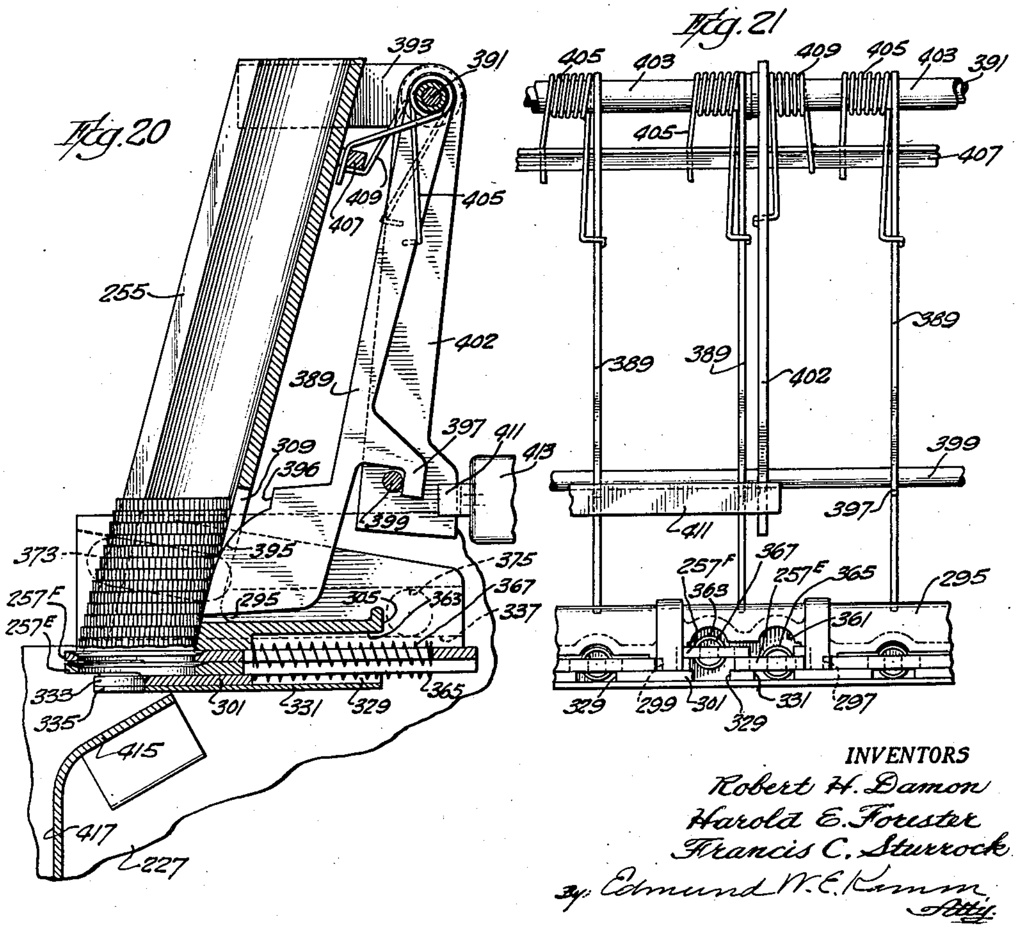
Figure 20 is a view similar to 19 but with the pawl retracted and showing two ejector slides in section.
Figure 21 is a rear view of the apparatus of Figure 20.

Spacers 403 are disposed on the rod 391 to hold the various levers 389, 401 in their proper positions. Springs 405, one for each lever 389, are coiled about the spacers so that one end of each spring is hooked in a bar 407 on the rear of the associated coin tube and the other end is hooked over the lever so as to urge it in a clockwise direction (Fig. 20). A spring 409 for the lever 402 is similarly mounted on a spacer but hooks under the bar 407 and bears in the opposite direction on the lever 402 to urge it counterclockwise (Fig. 20) so as to force the rod 399 against the hooks 397. The spring 409 is weak so that any one of the springs 405 will overcome it.

Lever 402 bears against the actuating lever 411 of a normally closed "empty tube switch" 413, the function of which will be described below. The switch is mounted on a rod 412 (Fig. 36) which extends between the main side frames.

When the level of coins in any tube falls below the level of the feeler 395 in that tube, the spring 405 of the associated lever 389 will swing it clockwise (Fig. 20) to the position shown in Fig. 19. The hook 397 on the lever will pull rod 399 to the left and rotate levers 401 and 402 in the same direction. When lever 402 is thus moved, the switch 413 is opened to prevent operation of the machine as described below.

It should be noted that any coins ejected by the slides will drop onto an inclined apron 415, which extends across the entire front of the machine and is mounted on the main side frames (Figs. 4, 12, 13, 20, 27, 32, 36 and 37), will slide into the inclined, U-shaped trough 417 and roll toward the left across the front of the machine where they will pass through an aperture 419, into a suitable receptacle, not shown, which is within reach of the customer.

*Power mechanism*

The various mechanisms described above are all actuated in a predetermined sequence, either manually or by the power mechanism. The manual setting of the stops 65 for the rack bars has already been described but no mention has been made of the means for actuating the rack bars, cams, cam followers, interponents, etc.

Figure 15:
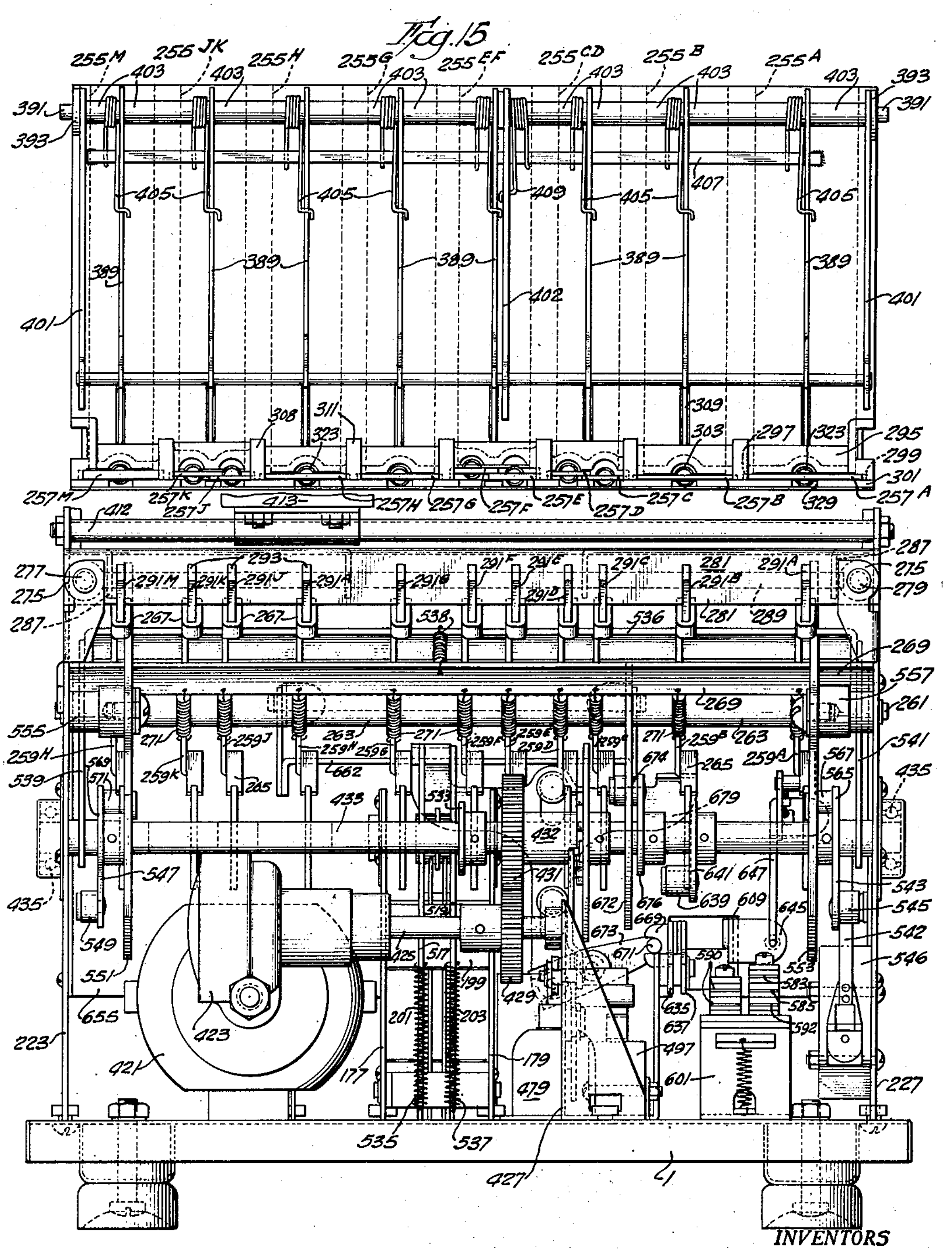
Figure 15 is a rear view of the machine with the housing removed and the coin holder raised above normal position to show the coin ejection means and their alignment with the ejector fingers. This view also shows the drive and cycle control mechanism in assembled relation.
Figures 10, 17:
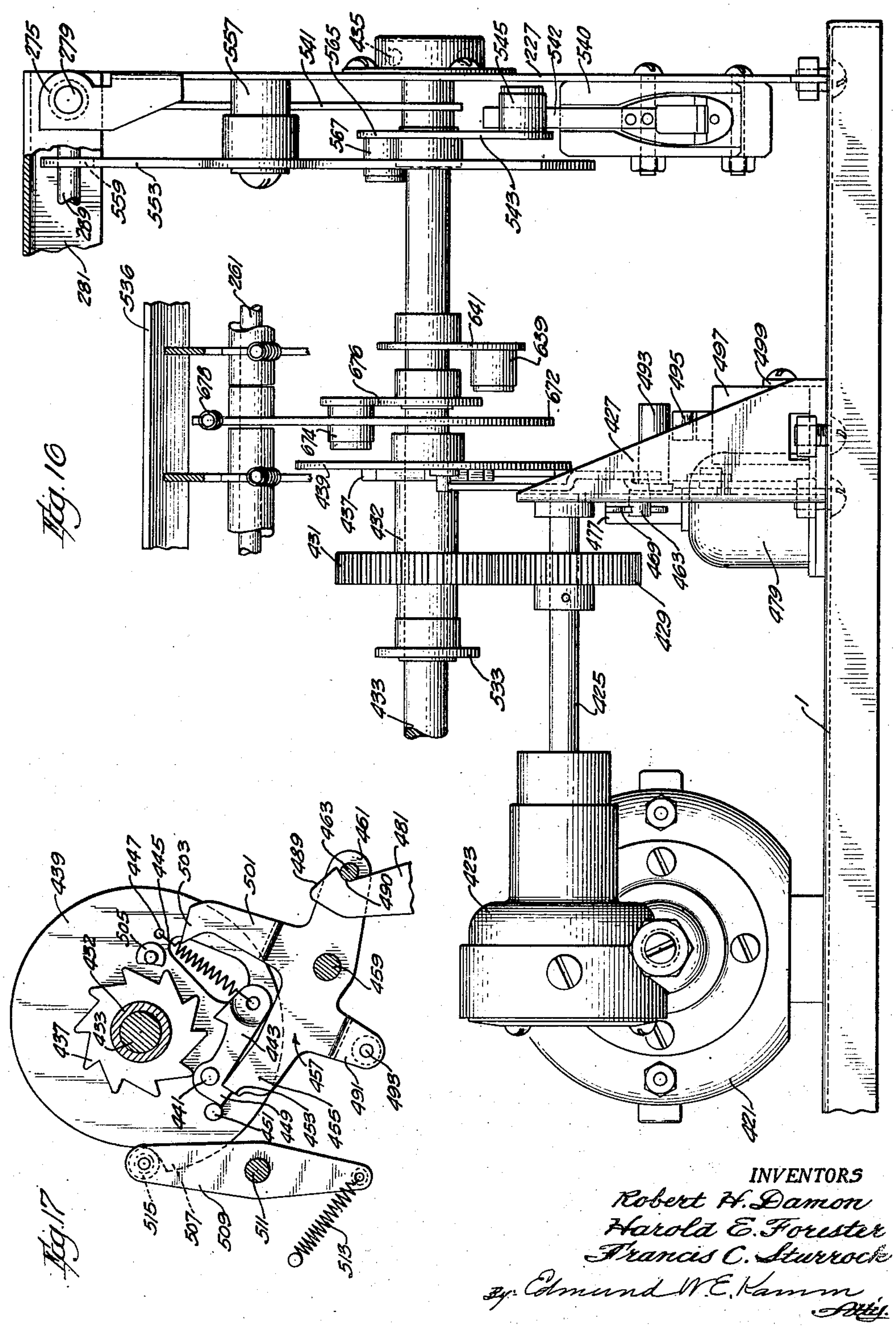
Figure 10 is a right side elevation of the selector mechanism.
Figure 17 is a side view taken from the left in Figure 16 showing the cycle controlling means.

It will be seen from Figs. 15, 16 and 17 that a motor 421 is mounted on base 1 and carries a speed reducing head 423 through which it drives the power shaft 425.

A bracket 427, also fixed to base 1, supports the other end of the power shaft. A drive gear 429 is fixed on shaft 425 and drives gear 431 which is fixed to sleeve 432 mounted to rotate on the countershaft 433 which is mounted in ball bearings 435 fixed to the side frames 223, 227 (Fig. 15). A ratchet 437 is fixed to the other end of the sleeve 432.

A disk 439 is fixed to shaft 433 and carries a pin 441 on which a pawl 443 is pivoted for movement into engagement with the ratchet under the action of spring 445 which has one end hooked into the pawl and the other end hooked in a hole 447 in the disk. The pawl 443 is provided with a tail 449 which is adapted to engage a pin 451 fixed in the disk upon rotation of the pawl away from the ratchet. This rotation is effected by an abutment 453 on arm 455 of a four-armed lever 457 which is mounted for oscillation on a pivot stud 459 fixed in bracket 427.

A second arm 461 extends from lever 457 in a direction substantially opposite to that of arm 455 and bears at its outer end a pin 463 which passes through a hole 465 in bracket 427 (see Figs. 12 and 13) and engages an open ended slot 467 in a lever 469. The latter is pivotally mounted near its center on a pin 471 fixed in bracket 427 and has an open ended slot 473 at its other end which receives a pin 475 in the armature 477 of a solenoid 479 which is mounted on the base.

A pawl 481 is pivotally mounted on a pin 483 fixed in the bracket 427 below pin 463 and is adapted to hook over the latter (Figs. 12 and 13), and is urged toward hooking position by a spring 485 connected at one end to the lower end of pawl 481 and at the other end to a pin 487 fixed in the bracket. The upper end of the pawl is provided with a slope 489 which enables the pin 463 to cam the pawl in a counterclockwise direction as it descends.

The lever 457 (Fig. 17) also carries an arm 491 which depends from arm 455 and carries a pin 493 which extends at right angles to the plane of the lever. The pin is disposed above the actuating spring 495 of a normally open "microswitch" 497 which is supported by bracket 499 on the base 1. The switch is shown closed in Fig. 13 and open in Fig. 16.

A restoring arm 501 extends upwardly from lever 457 and bears a projection 503 which is directed toward the ratchet. A pin 505 is set in disk 439 and is adapted to engage the projection as the disk rotates counterclockwise (Fig. 17) to roate lever 457 clockwise to the position of Fig. 17, which is its normal or inactive position.

The edge of the disk is formed with a cam projection 507 and a follower lever 509 is pivoted at 511 on bracket 427. A spring 513 connected at one end to the lever and at the other end to the bracket, urges the lever clockwise (Fig. 17). The roll 515 carried by the upper end of the lever is, therefore, urged against the edge of the disk; and in the normal or inoperative position of the parts, it lies above the projection 507.

The function of the mechanism thus far described is to produce one complete rotation of the countershaft 433 each time the solenoid 479 is energized.

When this occurs, the armature 477 is drawn downwardly to tilt lever 469 counterclockwise (Figs. 12 and 13). Since the portion 490 of the pawl 481 which engages pin 463 is rounded, the magnet can readily overcome the pawl and cause the pin 463 to escape it. The pawl serves merely as a detent and not as a locking pawl. As the pin is raised, lever 457 is rotated counterclockwise.

This causes the projection 503 to be moved toward the ratchet where it will be in the path of the pin 505; it also causes the abutment 453 to release the tail 449 of pawl 443, whereupon spring 445 will force the pawl into engagement with the ratchet 437 and the pin 493 will depress the switch lever 495 and close switch 497 to energize motor 421.

The motor drives shaft 425 and gear 429 through the gear box 423. The motion is transmitted through gear 431 and sleeve 432 to the ratchet 437 which is driven counterclockwise (Fig. 17). Since the pawl 443 is engaged with the ratchet, it and the disk 439 will likewise drive the countershaft 433 in the same direction.

The solenoid is held energized during the cycle by means later to be described. However, as the pin 505 comes into contact with projection 503, the levers 457 and 469 are restored by it to their initial position and switch 497 opens to deenergize the motor. The abutment 453 moves into position ahead of tail 449 and as the ratchet, motor and associated parts coast on, withdraws the pawl 443 from the ratchet. The pin 451 determines the outward position of the pawl and the detent roll 515 engages the projection 507 on the disk so as to prevent a reverse rotation thereof under the action of spring 445.

The motor, ratchet, etc., are thus freed from the countershaft which is stopped in a predetermined position while the motor and its parts coast to a stop. The pin 463 was, of course, restored to control of the detent pawl 481 by camming the pawl counterclockwise, as it rode down the pawl incline 489, during the clockwise rotation of lever 457 just described.

*Rack restoring means*

It will thus be understood that the countershaft 433 makes one counterclockwise revolution, 360 degrees, each time the motor is actuated.

Reference to Figs. 12, 13, 14, 15, 18 and 38 will disclose that a pair of similarly formed resetting levers 517 and 519 are pivotally mounted on the shaft 521 which is supported between the frame members 177 and 179 (Figs. 15 and 38 respectively). The levers carry gear sectors 523 and 525 respectively which mesh with cam shaft gears 209 and 215 respectively. The levers have projections 527 and 529 extending upwardly above the sectors and which project into the path of a roll 531 mounted on lever 533 which is fixed to the countershaft 433. The projections are preferably tapered on the side adjacent the rolls to minimize the impact of the roll upon them.

The lever 533 normally occupies a horizontal position with the roll against the projections so as to hold them to their initial positions. With the keyboard actuated to select stop positions for the control bars 119 and 121, when the motor is actuated, the roll moves away from the projections and the latter, with the control bars, will follow to the limit determined by the stops. This is due to the fact that the racks of the corresponding bars and the sectors of the levers engage the same gears.

When the roll, in returning to its initial position, picks up the projections on the reset levers, it will restore both the levers and the bars to their normal positions and will hold them there until the next operation of the motor.

If desired, springs 535 and 537 may be connected between the levers 517 and 519 respectively and the base 1, although ordinarily the springs 201 and 203 on the rack bars suffice.

Rotation of the countershaft from starting position through the first 65 degrees is sufficient to fully clear the levers and set up the cam combinations, while rotation of the shaft from the 285 degree position to the 360 degree position is used to restore them.

*Cam follower restoring bar*

As described above, the cam followers 259-A, B, C, D, E, F, G, H, J, K and M drop down into, or upon, the peripheries of their respective cams during a portion of the cycle, while at all other times they are held away from the cams by a restoring bar 536 which is pivotally mounted on the rod 261 described above (see Figs. 12, 13, 15, 16—also 18, 36, 37 and 38). A spring 538, connected between the restoring bar and the spring anchor bar 269, holds the bar 536 down against the followers to the rear of their pivot rod 261 and thus normally holds them away from the cams.

Levers 539 and 541 are connected to the bar at either end and depend therefrom as shown particularly in Figs. 12, 13, 16 and 37. A crank 543 (Fig. 16) having a roll 545 mounted thereon is fixed to the countershaft, and the roll projects into the path of the lever 541 so as to operate it for a portion of the rotation of the countershaft. The lever is contacted after the countershaft rotates far enough to permit levers 517 and 519 to be fully actuated, is held until after the carriage 281 has completed its forward and return strokes when it is released by the roll and is restored to its initial position by the spring 538. In moving back to the initial position, it withdraws the cam followers from the cams so that the latter can be subsequently reset as described above. Rotation of the countershaft from the 65 degree position to the 100 degree position is used to lift the bar, which is then held lifted until the shaft is rotated to the 240 degree position and, thereafter, the bar is restored to initial position during rotation of the shaft to the 285 degree position.

A switch 540 is supported on the side frame 227 and has an operating lever 542 disposed in the path of roll 545, this to be actuated thereby, momentarily, at the end of the travel of the countershaft. The roll passes the lever as it moves to its final position so that the switch, which is a normally open one, will reopen.

Lever 539 (Fig. 15) is identical with 541 and is operated by a lever 547 having a roll 549 mounted parallel with 543 and 545. Power is thus applied at both ends of the bar to prevent distortion thereof.

*Carriage operator*

As described above, the carriage 281 is reciprocated to actuate the coin ejecting slides. This is effected by the power mechanism as seen in Figs. 12, 13, 15, 16 and 37.

Levers 551 and 553 (Fig. 15), which are identical in outline, are pivotally mounted on studs 555 and 557 fixed to side frames 223 and 227 respectively.

As is clearly shown in Figs. 12 and 16, the upper end of the lever 553 is slotted at 559 to receive the rod 289 of the carriage 281. The lower end of the lever is formed as a closed loop. The forward part 561 of the interior edge of the loop is struck as a radius from the center of the countershaft 433, while the rear portion 563 is disposed nearer to the center of the shaft so as to form a cam.

The lever 543 carries an arm 565 which bears a roll 567. The latter extends into the loop of lever 553 and rides freely upon the arcuate portion 561 thereof when the carriage and lever are in the normal or returned position. However, when the portion 563 of the lever is reached during travel of the roll, the distance between the inner edge of the lever and the center of shaft 433 becomes less than the radius to the exterior of the roll 567, and the lever 553 will be rotated counterclockwise (Figs. 12 and 13) to advance the carriage from the initial position, as shown in Fig. 12, to the actuated position shown in Fig. 13. This is accomplished by rotation of the countershaft from about its 100 to its 170 degree position.

In the event the carriage should bind and not be returned by springs 283, the roll 567 will engage the arcuate part of the lever and return it clockwise (Figs. 12 and 13) to restore the carriage to normal position. This occurs during the rotation of the countershaft from the 170 to the 240 degree position.

A similar lever 569 and roll 571 are mounted on the other end of the counter shaft for actuating the lever 551. Thus power is applied at both ends of the carriage simultaneously.

*Electrical system*

Figures 24, 39:
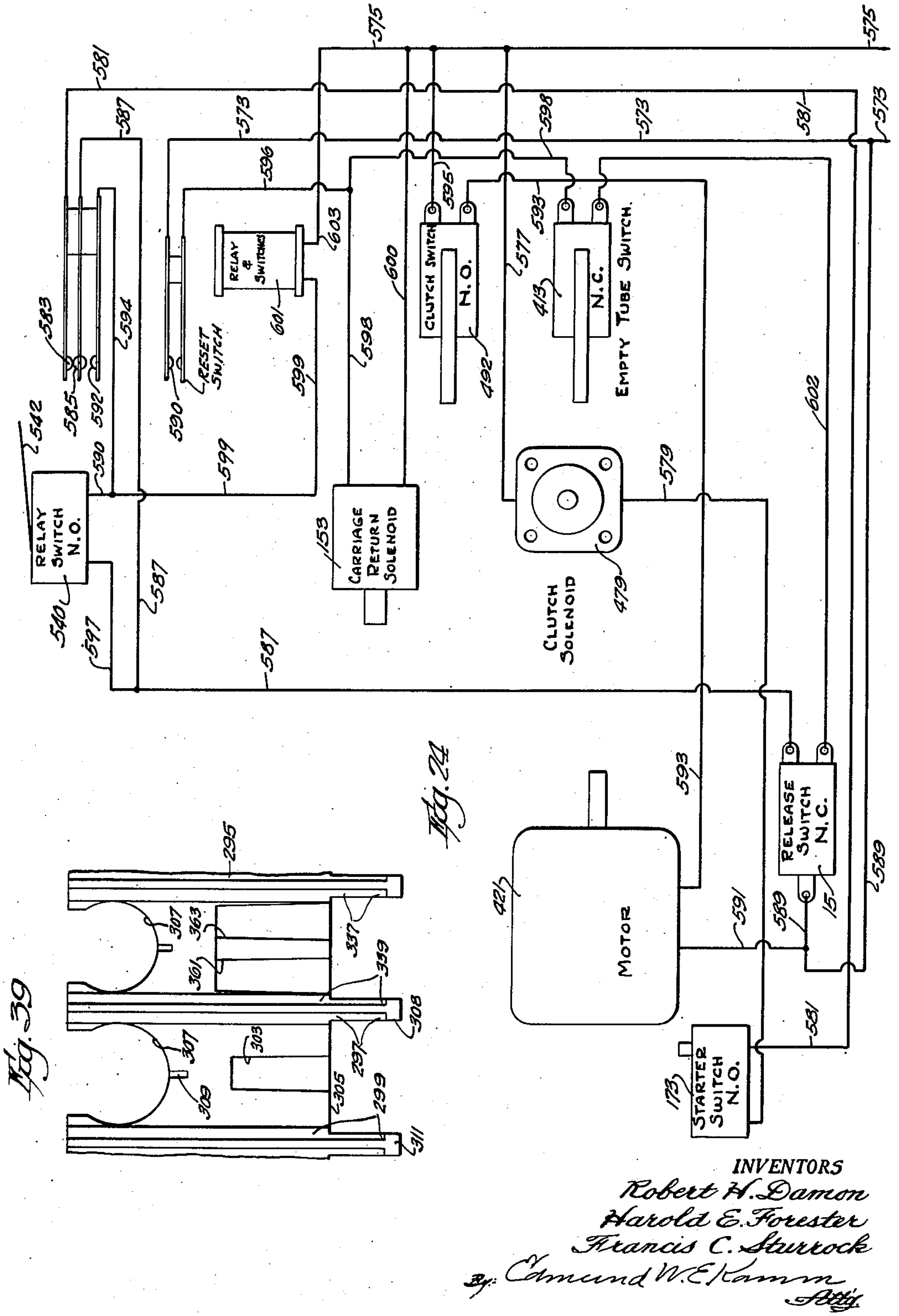
Figure 24 is a wiring diagram of the machine.
Figure 39 is a bottom view of the magazine base casting showing the spring sockets and guide ways for the ejector slides.

As will be seen from Fig. 24, power is supplied to the unit through the mains 573 and 575. A line 577 connects the clutch solenoid with main 575 while a second line 579 connects the solenoid with the normally open starter switch 173. The other side of the switch is connected by line 581 to contact 583 which engages contact 585 connected by line 587 to the normally closed release switch 15. From the other side of the switch, part of line 589 and line 591 connect with the motor 421; and from the other side of the motor, the line 593 runs to normally open clutch switch 492. A line 595 connects the other side of this switch with the main 575. Line 589 runs beyond the junction with 591 and connects directly with the main 573.

The switch 15 closes as soon as any of the selector keys are operated since the contacts 583 and 585 are normally closed.

The relay switch 540 is normally open and is connected by wire 597 with the wire 587 and hence to line 573 via switch 15 and line 589. The other side of switch 540 is connected by wire 599 with the relay 601, and line 603 connects the relay with main 575. Switch 540 is also connected by wire 594 with the lower contact 592 which is normally out of contact with 585.

The carriage return solenoid 153 is connected by wire 600 to main 575 while on its other side it is connected by wire 598 to the normally closed empty tube switch 413. The other side of the latter is connected by line 602 to the same side of switch 15 as line 587.

In operation, as soon as a key is operated and the keyboard carriage shifts, the release switch 15 closes. Thereafter, when motor bar 11 is depressed, switch 173 is closed momentarily to establish a circuit from main 575, through line 577, clutch solenoid 479, line 579, switch 173, line 581, switch 583—585, line 587, release switch 15, line 589 to main 573. Since switch 15 is included in this circuit, it will be obvious that the starter switch 173 is ineffective unless the release switch has been closed by operation of the carriage 51.

As described above, as soon as solenoid 479 is energized, the lever 491 and pin 493 (Fig. 17) close the clutch switch 492 which, in turn, closes a circuit from main 575, line 595, switch 492, line 593, motor 421, lines 591 and 589 to the main 573. The motor is thus energized and the operation of the machine proceeds automatically until roll 545 (Fig. 16) closes relay switch 540.

This closes a circuit from main 573, through switch 15, line 587 to the junction with line 597 and proceeds by way of line 597 through switch 540, line 599 to relay 601, and thence by line 603 to main 575.

The relay 601 being thus energized closes switch 590, opens switch 583—585 and closes switch 585—592.

Closure of switch 585—592 simply establishes a by-pass in parallel across switch 540 so that the circuit through the relay will be held.

Closure of switch 590 closes a circuit from main 573, switch 590, through lines 596 and 598, carriage return solenoid 153, line 600 to main 575 to energize the solenoid and return the carriage which in turn reopens the release switch 15. Opening of this switch breaks the circuit through the relay 601 and, since switch 540 has been mechanically reopened, the relay will remain dead. Switch 590 reopens to kill solenoid 153 while switch 592—585 is opened and 585—583 reestablished. The clutch switch is reopened mechanically so that the entire device is conditioned for a succeeding cycle.

The empty tube switch 413, as stated above, is connected to release switch 15 and to the carriage return solenoid 153. The switch is self closing but is held open when an adequate supply of coins is held in the magazines. When a magazine runs low, the switch closes. Since it is in series with the release switch 15 and since the latter closes each time the carriage is moved by operation of the keys, it follows that when switch 413 is closed, the circuit through the carriage return solenoid 153 will be closed each time a key is operated; and as the carriage returns, it opens switch 15. This operation will be repeated until a new supply of coins is placed in the empty magazine, thus effectively preventing operation of the machine.

The Changer

As stated above, the function of the machine thus far described is to return exactly the amount of change indicated by the keys set on the keyboard.

The modification now to be described is intended to issue the difference between the amount of the sale and the amount tendered in payment thereof. Since sales amounts of from one cent to one dollar are contemplated, it is obvious that a dollar will often be tendered. The machine is therefore constructed to normally issue the difference between the sum set up on the keyboard and one dollar.

However, when a sale of between 51 and 74 cents is made, 75 cents will commonly be offered in payment. This requires withholding 25 cents of the amount which would normally be issued by the machine. This is done very simply by preventing the operation of the cam followers for the B, C, E, F and H coin magazines, as will be more fully set forth below.

When a sale of between 26 and 49 cents is made, a 50 cent piece may be offered in payment; consequently, it is necessary to withhold 50 cents of the change which would ordinarily be returned by the machine. This is done by preventing the operation of the 50 cent magazine.

When a sale of between 1 and 24 cents is made, either a 50 cent or a 25 cent piece may be offered in payment. In the case of the former, 50 cents must be withheld, which is done by preventing the operation of the 50 cent magazine.

However, when a quarter is tendered, it is necessary to withhold 75 cents of the amount which would normally be returned, and this is accomplished by preventing the operation of the A, B, C, E, F and H magazines as described below.

With this preliminary description, attention is directed first to Figure 28 which depicts the cams 650–A, B, C, D, E, F, G, H, J, K and M which are substituted for the cams 231–A to M respectively on the shaft 217, and the additional cam 666 which is disposed between 605–B and C and has two notches, one at the number 1 and the other at the number 6 position.

The keyboard, control racks and all of the other mechanism involved remains the same so that the pattern of slide operation now follows Chart B. On the charts, wherever a slide operation is indicated a notch will be provided in the corresponding cam to receive the corresponding cam follower 259. It will be noted from the charts that the cams are constructed and arranged to deliver the difference between the sale price set up on the keyboard and one dollar, as will be more fully disclosed below.

CHART B

| | | TENS | | | | | | UNITS | | | | |
|---|---|---|---|---|---|---|---|---|---|---|---|---|
| | | A (50) | B (25) | C (10) | D (10) | E (5) | F (5) | G (5) | H (5) | J (1) | K (1) | M (2) |
| Sale | Del. | | | | | | | | | | | |
| 100 | 100 | A | B | C | | E | | G | H | | | |
| | | | | | | | | | | | | |
| 1 | 99 | A | B | C | | E | | | H | J | K | M |
| 2 | 98 | A | B | C | | E | | | H | J | | M |
| 3 | 97 | A | B | C | | E | | | H | | | M |
| 4 | 96 | A | B | C | | E | | | H | J | | |
| 5 | 95 | A | B | C | | E | | | H | | | |
| 6 | 94 | A | B | C | | E | | | | J | K | M |
| 7 | 93 | A | B | C | | E | | | | J | | M |
| 8 | 92 | A | B | C | | E | | | | | | M |
| 9 | 91 | A | B | C | | E | | | | J | | |
| 10 | 90 | A | B | | | E | | G | H | | | |
| 11 | 89 | A | B | | | E | | | H | J | K | M |
| 12 | 88 | A | B | | | E | | | H | J | | M |
| 13 | 87 | A | B | | | E | | | H | | | M |
| 14 | 86 | A | B | | | E | | | H | J | | |
| 15 | 85 | A | B | | | E | | | H | | | |
| 16 | 84 | A | B | | | E | | | | J | K | M |
| 17 | 83 | A | B | | | E | | | | J | | M |
| 18 | 82 | A | B | | | E | | | | | | M |
| 19 | 81 | A | B | | | E | | | | J | | |
| 20 | 80 | A | | C | | E | F | G | H | | | |
| 21 | 79 | A | | C | | E | F | | H | J | K | M |
| 22 | 78 | A | | C | | E | F | | H | J | | M |
| 23 | 77 | A | | C | | E | F | | H | | | M |
| 24 | 76 | A | | C | | E | F | | H | J | | |
| 25 | 75 | A | | C | | E | F | | H | | | |
| 26 | 74 | A | | C | | E | F | | | J | K | M |
| 27 | 73 | A | | C | | E | F | | | J | | M |
| 28 | 72 | A | | C | | E | F | | | | | M |
| 29 | 71 | A | | C | | E | F | | | J | | |
| 30 | 70 | A | | C | | | | G | H | | | |
| 31 | 69 | A | | C | | | | | H | J | K | M |
| 32 | 68 | A | | C | | | | | H | J | | M |
| 33 | 67 | A | | C | | | | | H | | | M |

| Sale | Del. | TENS A (50) | B (25) | C (10) | D (10) | E (5) | F (5) | UNITS G (5) | H (5) | J (1) | K (1) | M (2) |
|---|---|---|---|---|---|---|---|---|---|---|---|---|
| 34 | 66 | A | | C | | | | | H | J | | |
| 35 | 65 | A | | C | | | | | H | | | |
| 36 | 64 | A | | C | | | | | | J | K | M |
| 37 | 63 | A | | C | | | | | | J | | M |
| 38 | 62 | A | | C | | | | | | | | M |
| 39 | 61 | A | | C | | | | | | J | | |
| 40 | 60 | A | | | | | | G | H | | | |
| 41 | 59 | A | | | | | | | H | J | K | M |
| 42 | 58 | A | | | | | | | H | J | | M |
| 43 | 57 | A | | | | | | | H | | | M |
| 44 | 56 | A | | | | | | | H | J | | |
| 45 | 55 | A | | | | | | | H | | | |
| 46 | 54 | A | | | | | | | | J | K | M |
| 47 | 53 | A | | | | | | | | J | | M |
| 48 | 52 | A | | | | | | | | | | M |
| 49 | 51 | A | | | | | | | | J | | |
| 50 | 50 | | B | C | | E | | G | H | | | |
| 51 | 49 | | B | C | | E | | | H | J | K | M |
| 52 | 48 | | B | C | | E | | | H | J | | M |
| 53 | 47 | | B | C | | E | | | H | | | M |
| 54 | 46 | | B | C | | E | | | H | J | | |
| 55 | 45 | | B | C | | E | | | H | | | |
| 56 | 44 | | B | C | | E | | | | J | K | M |
| 57 | 43 | | B | C | | E | | | | J | | M |
| 58 | 42 | | B | C | | E | | | | | | M |
| 59 | 41 | | B | C | | E | | | | J | | |
| 60 | 40 | | B | | | E | | G | H | | | |
| 61 | 39 | | B | | | E | | | H | J | K | M |
| 62 | 38 | | B | | | E | | | H | J | | M |
| 63 | 37 | | B | | | E | | | H | | | M |
| 64 | 36 | | B | | | E | | | H | J | | |
| 65 | 35 | | B | | | E | | | H | | | |
| 66 | 34 | | B | | | E | | | | J | K | M |

CHANGER 7 8 9

4 5 6

1 2 3

100 0

| Sale | Del. | TENS A (50) | B (25) | C (10) | D (10) | E (5) | F (5) | UNITS G (5) | H (5) | J (1) | K (1) | M (2) |
|---|---|---|---|---|---|---|---|---|---|---|---|---|
| 67 | 33 | | B | | | E | | | | J | | M |
| 68 | 32 | | B | | | E | | | | | | M |
| 69 | 31 | | B | | | E | | | | J | | |
| 70 | 30 | | | C | | E | F | G | H | | | |
| 71 | 29 | | | C | | E | F | | H | J | K | M |
| 72 | 28 | | | C | | E | F | | H | J | | M |
| 73 | 27 | | | C | | E | F | | H | | | M |
| 74 | 26 | | | C | | E | F | | H | J | | |
| 75 | 25 | | | C | | E | F | | H | | | |
| 76 | 24 | | | C | | E | F | | | J | K | M |
| 77 | 23 | | | C | | E | F | | | J | | M |
| 78 | 22 | | | C | | E | F | | | | | M |
| 79 | 21 | | | C | | E | F | | | J | | |
| 80 | 20 | | | C | | | | G | H | | | |
| 81 | 19 | | | C | | | | | H | J | K | M |
| 82 | 18 | | | C | | | | | H | J | | M |
| 83 | 17 | | | C | | | | | H | | | M |
| 84 | 16 | | | C | | | | | H | J | | |
| 85 | 15 | | | C | | | | | H | | | |
| 86 | 14 | | | C | | | | | | J | K | M |
| 87 | 13 | | | C | | | | | | J | | M |
| 88 | 12 | | | C | | | | | | | | M |
| 89 | 11 | | | C | | | | | | J | | |
| 90 | 10 | | | | | | | G | H | | | |
| 91 | 9 | | | | | | | | H | J | K | M |
| 92 | 8 | | | | | | | | H | J | | M |
| 93 | 7 | | | | | | | | H | | | M |
| 94 | 6 | | | | | | | | H | J | | |
| 95 | 5 | | | | | | | | H | | | |
| 96 | 4 | | | | | | | | | J | K | M |
| 97 | 3 | | | | | | | | | J | | M |
| 98 | 2 | | | | | | | | | | | M |
| 99 | 1 | | | | | | | | | J | | |

Referring now to Figs. 2, 3, 27, 37 and 38, and particularly to Fig. 37, it will be seen that two bars 607 and 609 are pivotally mounted at the left of the keyboard on a horizontal pin 611 which projects from the side frame 21. The bar 607 has an ear 613 which projects over the top of bar 609 so that when the bar 609 is operated 607 will also be operated. Actuating buttons 615 and 617 are fixed to suitable projections on the bars 607 and 609 respectively; the former bears the legends 25, 75 while the latter bears a legend 50.

Two double armed levers 619 and 621 respectively are pivotally mounted on a pin 623 which is supported horizontally in a standard 625 fixed to the base. The lever 607 is pivotally and loosely connected at 627 to one arm of lever 619 while lever 609 is pivotally connected to 629 to the corresponding arm of lever 621 to form a toggle. Overcenter springs 631 and 633 are connected to span the pivots. The arms 635 and 637 of levers 619 and 621 project to the rear of the machine into a position where they can be reset to initial position by the roll 639 attached to arm 641 fixed to the countershaft 433.

The cam followers 259–A, 259–B, 259–C, 259–E, 259–F and 259–H are each provided with a projection 643.

The lever 609 is provided with an outwardly bent ear 645 (Fig. 37 especially) which is perforated to receive a link 647. A bell crank 649 is pivotally mounted on a pin 651 carried by a bracket 653 extending rearwardly from the front plate 655. One arm of the crank receives the upper end of the link and the other arm carries a pin 657 which is adapted to engage under the projection 643 of the fifty cent follower 259–A when the lever 609 is depressed. The spring 633 holds the lever in this position during one cycle of the machine.

A pair of ears 659 project rearwardly from the front plate and support between them the rod 661 (Figs. 13, 36 and 37). Pivoted on the rod and depending therefrom is a bail 662. One vertical side of the bail has a downwardly extending arm 663 provided with a cam follower 665 adapted to contact the cam 666.

The rear edge of arm 663 is also formed as a resetting cam 664 which is adapted to be engaged by a roll 668 on a bell crank lever 670 which is pivotally mounted on shaft 261. The lever has a curved arm 672 which is adapted to be actuated by a roll 674 on an arm 676 fixed to the countershaft 433. A spring 678 connected between the lever and the bar 269 urges the lever in a clockwise direction (Fig. 37).

A spring 667 is wrapped about the rod 661 and bears on the bail, tending to rotate it in a counterclockwise direction (Fig. 37) into position under the projections 643 on the followers 259 C, E, F and H.

The lever 607 carries an angle member 669 which is connected by a pivot pin at 671 to a two-armed lever 673 fulcrumed at 675 on the front plate. The other end of the lever is provided with an open ended slot 677. A T-shaped slide 679 is mounted for vertical movement at the rear of the front plate 655 by means of guide slots 681 which receive headed pins 683 which are set in the rear side of the front plate. The lower end of the slide bears a pin 685 which enters the slot 677. The right-hand lateral arm of the slide (Fig. 37) is provided with a hook 687 which is adapted, in the lower position of the slide, to retain the bail in its clockwise position. The end of the hook is bevelled as at 689 to facilitate reengagement of the hook with the bail.

The other arm of the slide has a rearwardly extending ear 686 which, when the slide is raised, holds the quarter cam follower 259–B away from its cam (see Fig. 38).

The depression of key 615 causes slide 679 to rise and free bail 661 from the hook. The bail is swung by the springs into position under the projections 643 of the cam followers noted above if, and when, the projection 665 is in alignment with a notch in cam 666 and will prevent them from operating. At the same time ear 686 prevents the operation of 259–B irrespective of whether the bail is rendered effective or not.

When the key 617 is depressed, the bell crank 649 will be swung clockwise (Fig. 37) to position the pin 657 under the projection 643 of the fifty cent cam follower 259–A and prevent it from entering its cam. However, since lever 607 actuates 609, through ear 613, both the slide 679 and the bell crank 649 will be operated to withhold 75 cents each time key 615 is depressed.

The depression of a key 615 deflects the toggle 607—619 downwardly and the spring 631 holds the levers in the "set" position. Similarly, the spring 633 holds toggles 609 and 621 in the "set" position. The outer ends of levers 619 and 621 are thus elevated so as to be in the path of the resetting roll 639.

As the roll 674 actuates arms 672 and 670, roll 668 rides on cam 664 and operates the latter, resets the bail to its initial position in which it can again be engaged by the hook 687 as it descends and also withdraws follower 665 from its cam. The hook is restored to bail holding position when the roll 639 resets the lever 619.

During the same rotation of the countershaft, the arm 641 rotates the roll 639 past the ends 635, 637 of the toggle levers and restores the levers 607, 609 and their respective keys 615, 617 to the initial position in which they are retained by the springs 631 and 633. It is, of course, necessary that sufficient play be left in the pivots 611, 629 and 623 to permit the free action of the toggles.

*General operation payer*

This device is operated upon the principle that the operator knows, or can quickly determine, the total value of the coins to be paid out. When the determination has been made the operator first strikes the key bearing the numeral corresponding to the tens digit and, secondly, strikes the key bearing the numeral corresponding to the units digit of the sum to be paid out. The keys must be struck in this order and if an error is made, the clearing key 13 may be operated to reset the carriage and the stops 65, whereupon the proper sum may be set up on the keyboard.

Any amount up to one dollar, in one cent intervals, may be set up in this manner on the keyboard. In the case of the one dollar setting this is the equivalent of setting double zero, since the first digit is moved beyond controlling position with respect to the rack bars 119 and 121.

The movement of the carriage away from the switch lever 169 results in closure of the switch so that upon depression of the operating bar 11 and closure of starter switch 173, the circuit will be established through clutch solenoid 479 (Fig. 24).

Operation of the solenoid closes the clutch switch 492 to energize the motor 421, and also trips the pawl 443 which will then clutch the countershaft 433 to the motor shaft 425 for one revolution.

During the first 65 degrees of rotation of the countershaft, the roll 531 moves away from the levers 517 and 519 (Figs. 12 and 14). The lever 517 is meshed with the gear 209 which also meshes with rack bar 119 so that the springs 535 and 201 cause the lever 517 to follow roll 531 until the associated units rack bar contacts the units stop which is set in its path. The degree of rotation of the units cam shaft to its operative position is thereby determined.

The lever 519, rack bar 121 and the tens cam shaft are similarly positioned by the stop which is projected into the path of the bar 121 since the gear 215 on the shaft meshes with both the lever and the bar.

An examination of the cams of Fig. 25 in connection with Chart A will disclose that the units and the tens cam shafts each have ten actuating positions and an initial position which are spaced apart about 18 degrees, as shown in connection with cam 231-E (Fig. 25). Thus the maximum rotation of the cam shafts is only about 180 degrees. Since the rotation of the cams is clockwise (Fig. 25) to the selected position, the position numbered H on cam 231-E corresponds to the home or reset position, 0 to the position determined by the zero key, 1 by the key numbered 1 and so on.

Figure 26:
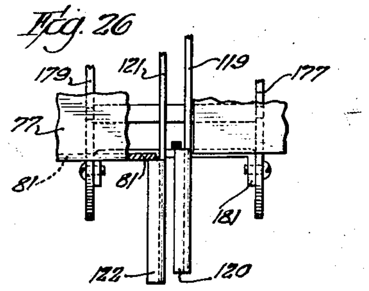
Figure 26 is a top view of the control or rack bars showing the units bar in contact with a stop.

Referring now to the chart, it will be seen that to pay one cent, the slide J must be actuated by cam 231-J. This occurs when the units cam shaft is rotated two steps to the number 1 position. Since no stop was set up in front of the tens control rack, this rack will not be actuated. It will be locked by the flange 81 (Fig. 26).

From the chart, to issue two cents, the units cam shaft will be displaced three steps to the number 2 position. This aligns the cam 231-M with its follower and the slide 257-M is actuated. Since this slide holds two cents, this amount will be ejected. It will be noted that none of the cams 231-G, H or K have notches in the number 1 or number 2 positions, hence their corresponding slides are not actuated.

In a manner similar to that described above, the operation of the number 3 key actuates the cam shaft to the number 3 position and in this position only cams 231-J and M have openings so that three cents are issued. When the number 4 key is pressed, the cam shaft moves to the number 4 position in which openings in cams 231-J, K and M are presented to the followers and the corresponding slides are operated to eject four cents.

To issue 6, 7, 8 or 9 cents, the same cent issuing pattern of operation described above is used in combination with one or the other of the nickel cams 231-G or 231-H. The nickel ejections are distributed between two tubes to insure a larger supply of nickels.

For ten cents, the keys numbered 1 and 0 are depressed successively and the units cam shaft is advanced to the zero position while the tens cam shaft advances two steps to the number 1 position. No cams on the units shaft present notches, while cam 231-C on the tens shaft presents a notch so that the corresponding dime slide 257-C is actuated.

To eject 20 cents, the tens shaft is rotated to the third (number 2) position in which cams 231-C, E and F present notches so that the corresponding dime and two nickel slides are actuated.

To issue 30 cents, the tens cam shaft is rotated by four steps to the third position in which cams 231-B and E present notches, and this results in the actuation of the 25 cent slide 257-B and nickel slide 257-E.

To issue 40 cents, cams 231-B, C and E present notches in the fifth or number four position to actuate the quarter, dime and nickel slides 257-B, C and E.

To issue 50 cents, cam 231-A only is provided with a notch in the sixth or number 5 position to actuate the half dollar slide 257-A.

To issue 60 cents, cam 231-A is combined with 231-C in the seventh or number 6 position to issue a half dollar and a dime.

To issue 70 cents, cams 231-A, C, E and F are provided with notches in the eighth or number 7 position to issue a half dollar, dime and two nickels.

To issue 80 cents, the cams 231-A, B and E present notches in the ninth or number 8 position to eject a half dollar, quarter and nickel.

To issue 90 cents, the cams 231-A, B, C and E present notches in the last or number 9 position to eject a half dollar, quarter, dime and nickel.

To issue any of the intermediate one cent increments, the pattern of the cam positions on the units cam shaft, described in connection with the issue of from one to nine cents, is coupled with the proper pattern of cam positions on the tens cam shaft for the ten cent increments.

In the zero or first position of the tens countershaft the cams 231-A, B, C, D and E present notches so as to eject a half dollar, a quarter, two dimes and a nickel. The cams on the units cam shaft do not present notches in the zero or number 1 position so that none of the associated slides are operated.

One dollar will be issued whether the keys numbered 1, 0 and 0 are pressed or whether simply the 0 and 0 key is pressed since it is only the tens shaft in its zero position which governs.

After the proper cam notches have been presented, further rotation of the countershaft 433 through 35 degrees will cause the levers 539 and 541 to be tilted by rolls 549 and 545 (Fig. 16) to raise the restoring bar 536 from the cam followers 259. Those cam followers which align with notches in the cams 231 will tilt to enter them while the remainder rest upon the exteriors of their associated cams. The tilting of the selected followers raise the associated interponents 291 into position to engage the associated ejector slides 257.

Upon further rotation of the countershaft 433 through 140 degrees and while the restoring bar is held actuated, the rolls 571 and 567 actuate the levers 551 and 553 to shift the carriage 287 and all of the slide actuating levers, including those which were positioned in the preceding event of the cycle, forwardly to actuate their corresponding ejector slides and thereafter turn them to the initial position.

The coin ejected from the magazine falls into trough 417 and is delivered by gravity to the payee.

After the carriage 287 is restored, an additional rotation of 45 degrees of the countershaft will remove rolls 545, 549 from lifting contact with levers 541, 539 and permit springs 538 (Fig. 12) to return the restoring bar to its normal position; and during such return, the tilted cam followers 259 are moved to their initial positions.

During the next 75 degrees of rotation of the countershaft, the roll 531 (Fig. 12) engages the projections 527, 529 on levers 517, 519 (Fig. 14) and restores these parts, the cam shafts and the rack bars 119, 121 to their initial position.

When the countershaft reaches a position which is a few degrees before the initial or 360-degree position, roll 545 closes the relay switch 540 to energize the relay 601 which, in turn, opens contacts 583, 585 to disable starter switch 173, closes contacts 585, 592 and switch 590.

Closure of contacts 583, 585 holds the relay 601 energized while switch 590 energizes the carriage return solenoid 153 to restore the keyboard carriage to its normal position.

The carriage, as it is restored, opens switch 15 and deenergizes the relay switch. Restoration of the carriage also resets the stops 65.

During the final few degrees of rotation of the countershaft, the pin 505 (Fig. 17) engages projection 503 and tilts lever 457 clockwise. This moves abutment 453 into position to engage tail 449 of dog 443 and, as this occurs, the dog is withdrawn from the ratchet 437. The motor, shaft 425 and the remainder of the train up to and including the ratchet may coast; but when the tail 449 of the dog is confined between abutment 453 and pin 451, the countershaft stops. The lever 509 engages cam 507 and prevents rebound of the countershaft.

The above described rotation of lever 457 also opens clutch switch 497 and returns the clutch solenoid 479 to initial position. It also restores the pin 463 to control by the detent 481. Thus all of the parts are again in their initial position ready for the succeeding cycle.

If the coins in a magazine become depleted, the associated seeker 395 will enter the magazine (Figs. 19, 20 and 21) and will withdraw the bail 411 from operating contact with switch 413 which will close. Thereafter, when any number key on the keyboard is actuated, the stop carriage will move away from its initial position and close switch 15. This will at once energize the carriage return solenoid 153 to restore the carriage and thereby prevent the machine from passing through its normal cycle. If such normal cycling were not prevented, it is obvious that an improper amount might be issued due to the shortage of coins in the magazine.

*General operation changer*

The operation of the changer is substantially the same as that of the payer except that the cam profiles are different so that instead of issuing the amount set up on the keyboard, the difference between the amount set and one dollar is returned and also that provision is made for withholding certain sums in order that proper change may be returned when sums such as 75 cents, 50 cents or 25 cents are offered in payment and, of course, such sums exceed the price asked. The withholding means is manually set and mechanically restored during a portion of the cycle of the reset shaft.

Referring now to the "Changer" Chart B and the cams shown in Fig. 28, it will be seen that the cam 605–D is a blank or disc because the second dime magazine is not utilized in this machine. As in the "Payer," the cams 605–A, B, C, D and E, together with cam 666, are mounted on the tens cam shaft 217 while the cams 605–F, G, H, J, K and M are on the units cam shaft 211.

For the sake of clarity, it is advisable to first consider the issue of cents as represented by the third page of the charts.

When the key numbered 9 is operated twice to set up a sale of 99 cents, the one cent slide 257–J must be operated to eject the complementary one cent. Accordingly, when the units and tens cams move to the number 9 position (ten steps removed from the home position, as shown in Fig. 28 with respect to cam 605–C) the cam 605–J, only, should present a notch to its associated cam followers as is shown in Fig. 28.

When keys 9 and 8 are pressed successively, the tens cams move to the number 9 position and the units cams move to the number 8 position where cam 605–M, only, presents a notch to its follower 259–M, and slide 257–M is operated to eject the complementary two cents.

When keys 9 and 7 are operated the tens shaft moves as before while the units cams 605–J and M are moved to the number 7 position to present notches so that three cents will be ejected.

Operation of keys 9 and 6 result in the units shaft cams being rotated to the number 6 position where cams 605–J, K and M present notches so that four cents will be ejected.

Upon operation of keys 9 and 5, the units shaft rotates to the number 5 position and cam 650–H, only, presents a notch so that a nickel will be ejected.

Thereafter, for sales of 94 and 93 cents, the units shaft will rotate to its number 4 and number 3 positions respectively to obtain operations of followers associated with the 605–H and J cams and the 605–H and M cams respectively. For sales of 92 and 91 cents, the shaft moves to its number 2 and number 1 positions to obtain operations of the followers associated with the 605–H, J and M and 605–H, J, K and M cams respectively.

Upon actuating the keys 9 and 0 for a sale of 90 cents, the cams 605–G and H are set up in the zero position of the units shaft so that the two corresponding nickel slides will be actuated.

It will be seen that to cover sales of from 89 to 80 cents, the same pattern of operation of the units cams as outlined above is combined with operation of a dime ejector slide 257–C which is controlled by a notch in cam 605–C when it occupies its number 8 position so that sums of from 11 to 20 cents will be issued.

Similarly, to cover sales of from 79 to 70 cents, the dime ejector slide 257–C and the two nickel slides 257–E and F are controlled by cams 605–C, E and F which have notches in the number 7 position; and this operation is added to the discharge pattern of the units cams so that sums of from 21 to 30 cents may be issued.

To cover sales of from 69 to 60 cents, the quarter and nickel slides 257–B and E are selected by cams 605–B and E in their number 6 position which, when combined with the ejection pattern of the units slide, issues the required change.

Sales of 59 to 50 cents are handled in a similar manner by means of cams 605–B and E in their number 6 position in combination with the units cam pattern; sales of 49 to 40 cents by cam 605–A in its number 4 position plus the units cam pattern; sales of 39 to 30 cents by cams 605–A and C in their number 3 position with the units cam pattern; sales of 29 to 20 cents by cams 605–A, C, E and F plus the units cam pattern; sales of 19 to 10 cents by cams 605–A, B and E in their number 1 position plus the units cam pattern and sales of 9 to 0 cents by cams 605–A, B, C and E plus the units cam pattern.

Pressing the key number 1 once and key zero twice is equivalent to pressing the zero key twice, as explained in connection with the payer, and issues a dollar's worth of change.

*Operation of withholding means*

51¢ TO 74¢ SALE—75¢ TENDERED

In the event the amount of a sale is between 50 and 75 cents, it is quite probable that the customer would offer 75 cents in coins. It is impossible to issue the correct change with the machine unless some of the coins which would normally be issued are withheld.

It will be seen from the chart entitled "Changer" (Chart B) that where the sale is from 74 to 70 cents, the slides C, E, F and H which issue a total of 25 cents are always operated. In addition, the G slide and the various penny slides are operated in various combinations; consequently, the bail 662 must prevent the followers 259–C, E, F and H from entering their respective cams.

This is done by depression of the hold key 615 since the cam 666 permits the dog 665 on the bail to enter when the tens shaft occupies its number 7 position. Of course, the blocking ear 686 is also set to prevent operation of the 259–B follower, but since its cam is not provided with a notch in the number 7 position it would not be actuated anyway.

It will also be seen from the above chart that from 51 cents to 69 cents, the follower 259–B is actuated in each case. However, upon depression of the hold key 615, the blocking ear 686 prevents entry of this follower into its cam so that 25 cents (one quarter) will be withheld all through this range of operation.

The hold key 615 also releases the bail but since there is no notch in cam 666 to receive the dog or follower 665, the bail cannot be effective to prevent operation of the C, E, F and H followers so that they will continue to operate.

26¢ TO 49¢ SALE—50¢ TENDERED

In the event the amount of the sale is between 25 and 50 cents, it is certain that a 50 cent piece will be tendered in payment. This makes it necessary to withhold 50 cents from the amount which would normally be issued by the machine.

It will be seen from an inspection of the "Changer" chart that in the case of each operation of the machine in the range between sales of 25 cents to 50 cents the cam follower 259–A is actuated in each case. Accordingly, the operation of this follower is simply prevented by the depression of the withholding key 617 which interposes the pin 657 below the projection 643 of the follower.

1¢ TO 24¢ SALE—25¢ TENDERED

Where the cost of a sale is between 1 cent and 25 cents, it is quite possible that the customer will tender a quarter dollar and, in such case, seventy-five cents will have to be withheld from the amount which would ordinarily be issued by the machine.

It will be seen from the "Changer" chart (Chart B) that for sales of 20 cents to 24 cents, the cam followers C, E, F and H which total 25 cents, are operated. Consequently, the cam 666 is provided with a notch in the number 2 position so that the follower 665 on the bail 662 may enter. Depression of the hold key 615 will then cause the bail to prevent the operation of the above mentioned followers so that the 25 cents will be withheld.

Since the key 617 will also be operated automatically when key 615 is depressed by reason of the interconnecting ear 613, the pin 657 is disposed below the projection 643 on cam follower 259–A and an additional fifty cents will be withheld.

If the cost of the sale is within the range of 1 cent to 19 cents, the cam 66, having no notch, prevents the operation of the bail and, therefore, the C, E, F and H followers may be actuated as required. However, since in each of these cases the 259–B follower is normally actuated, the ear 686 is set up to prevent the operation of this follower and to withhold the quarter which would otherwise be paid out.

In each case, after the operation of a withholding key, the ensuing operation of the motor actuates the roll 668 for restoring the bail and roll 639 for restoring the keys and their associated parts to the initial position. The various other, mechanism actuating and restoring events described in connection with the "Payer" are produced, in the same order, in the "Changer."

It is obvious that various changes may be made in the form, structure and arrangement of parts without departing from the spirit of the invention. Accordingly, applicants do not desire to be limited to the specific embodiment disclosed herein primarily for purposes of illustration; but instead, they desire protection falling fairly within the scope of the appended claims.

What we claim to be new and desire to protect by Letters Patent of the United States is:

1. In a coin issuing device, the combination of a keyboard comprising only ten operable keys having values from zero to nine, any one of said keys being operable in a number of distinct operations, a plurality of coin magazines, means for ejecting coins from said magazines, means responsive to the first operation of one of said keys for conditioning certain of said ejecting means for operation, means responsive to the second operation of one of said keys for conditioning certain other ones of said ejecting means for operation, and means operable thereafter for operating said conditioned ejecting means, said responsive means being constructed and arranged to condition said ejecting means to eject coins in multiples of one cent through the range of from one to one hundred cents in response to the operation of said ten keys singly or in combinations.

2. In a coin issuing device, the combination of a keyboard comprising only ten operable keys having values from zero to nine, any one of said keys being operable in a number of distinct operations, a plurality of coin magazines, means for ejecting coins from said magazines, means responsive to the first operation of one of said keys for conditioning certain of said ejecting means for operation, means responsive to the second operation of one of said keys for conditioning certain other ones of said ejecting means for operation, the ejecting means conditioned being adapted to issue coins having a tens value proportional to the value of the key first operated and a units value proportional to the value of the key operated second, and means operable thereafter for operating said conditioned ejecting means, said responsive means being constructed and arranged to condition said ejecting means to eject coins in multiples of one cent through the range of from one to one hundred cents in response to the operation of said ten keys singly or in combinations.

3. In a coin issuing device, the combination of a keyboard comprising only ten operable selector keys, a carriage mounted for movement adjacent said keyboard, a number of sets of stops mounted in said carriage for movement between initial and actuated positions selectively by said keys, carriage shifting means operable by said keys to position the sets of stops successively for actuation by said keys and means under control of said actuated stops for issuing coins having a predetermined total value corresponding to the keys operated.

4. In a coin issuing device, the combination of a keyboard comprising only ten operable selector keys, a carriage mounted adjacent said keyboard for movement away from an initial position, a number of sets of stops mounted in said carriage for movement between initial and actuated positions selectively by said keys, carriage shifting means operable by said keys to position the sets of stops successively for actuation by said keys, means under control of said actuated stops for issuing coins having a predetermined total value corresponding to the keys operated, means for restoring said carriage to initial position after issue of said coins and means operable during the restoration of said carriage for resetting said stops in initial position.

5. In a coin issuing device, the combination of a keyboard comprising only ten operable selector keys adapted to be operated singly and successively in combination, a carriage mounted for movement adjacent said keyboard, a number of sets of stops mounted in said carriage for movement between initial and actuated positions selectively by said keys, one set of stops being normally positioned for movement by the keys, means responsive to the operation of a key for positioning another set of stops for movement by the next operated key, means under control of said first actuated stops for issuing coins having a predetermined total value corresponding to the key first operated, said totals varying serially by intervals of tens, and means under control of said second actuated stops for issuing coins having a predetermined total value corresponding to the second operated key, said last mentioned totals varying serially by intervals of unity.

6. In a coin issuing device, the combination of a keyboard having ten operable selector keys, said keys being operable singly and successively in combination, a plurality of groups of stops, each stop being mounted for movement between retracted and actuated positions, one stop of each group being normally positioned for actuation by a key, means operable by any of the keys for positioning the next stop of each group for actuation, means on each key for operating the positioned stops in a predetermined group of stops upon successive key operations, and means under control of said actuated stops for issuing coins having a different predetermined total value for each key and for the successive actuation of each key.

7. In a coin issuing device, the combination of a keyboard having ten operable selector keys, said keys being operable singly and successively in combination, a plurality of groups of stops, each stop being mounted for movement between retracted and actuated positions, one stop of each group being normally positioned for actuation by a key, means operable by any of the keys for positioning the next stop of each group for actuation, means on each key for operating the positioned stop in a predetermined group of stops upon successive key operations, and means under control of said actuated stops for issuing coins having a different predetermined total value for each key, said keys having values of from zero to nine and said last named means being constructed and arranged so that the total values of coins issued in response to single and successive key operations vary, in series, by intervals of one cent over a range of at least ninety-nine cents.

8. In a coin issuing device, the combination of a keyboard having ten operable selector keys, said keys being operable singly and successively in combination, a plurality of groups of stops, each stop being mounted for movement between retracted and actuated positions, one stop of each group being normally positioned for actuation by a key, means operable by any of the keys for positioning the next stop of each group for actuation, means on each key for operating the positioned stop in a predetermined group of stops, upon successive key operations, and means under control of said actuated stops for issuing coins having a different predetermined total value for each key, said keys having values of from zero to nine and said last named means being constructed and arranged so that the total value of coins issued varies, in series, by intervals of one cent in proportion to the value of the key last operated and by intervals of ten cents in proportion to the value of the first of two keys operated in succession.

9. In a coin issuing device, the combination of a keyboard having ten operable selector keys, said keys being operable singly and successively in combination, a plurality of groups of stops, each stop being mounted for movement between retracted and actuated positions, one stop of each group being normally positioned for actuation by a key, means operable by any of the keys for positioning the next stop of each group for actuation, means on each key for operating the positioned stop in a predetermined group of stops upon successive key operations, and means under control of said actuated stops for issuing coins having a different predetermined total value for each key, said keys having values of from zero to nine and said last named means being constructed and arranged so that the total value of coins issued varies, in series, by intervals of one cent in inverse proportion to the value of the key last operated and by intervals of ten cents in inverse proportion to the value of the first of two keys operated in succession.

10. In a coin issuing device, the combination of a keyboard having ten operable selector keys, a plurality of rows of stops, each row extending transversely of the keyboard, said stops being mounted for movement between retracted and actuated positions, means on each key for operating the corresponding stops in a predetermined row, means under control of said actuated stops for issuing coins having a different predetermined total value for each key, and means responsive to the operation of any key for shifting said stops relative to said operating means in a direction parallel to said rows to position the next stop in each row for actuation by said operating means.

11. In a coin issuing device, the combination of a keyboard having ten operable selector keys adapted to be operated singly but in succession, a plurality of rows of stops, each row extending transversely of the keyboard, said stops being mounted for movement between retracted and actuated positions, means on each key for operating, individually, the corresponding stops in a predetermined row, means for shifting all of said stops in a direction parallel to said rows to position the next stop in each row for actuation by said operating means upon the operation of a key, and means under control of the first actuated stop for issuing coins having a different predetermined total value for each key, and additional means under control of said second actuated stop for issuing coins having a different predetermined total value for each key.

12. In a coin issuing device, the combination of a keyboard having ten operable selector keys, a plurality of stops for operation by each key, each stop being mounted for movement relative to its key and between retracted and actuated positions by its key, means on each key for operating a predetermined stop, means for normally holding a stop in position for operation by each key, means operable by each key for moving all of the stops relative to the keys to withdraw the positioned stops from said positions after actuation of a stop and to move other stops into said positions for the subsequent actuation of one of them, and means under control of the first and second actuated stops for issuing coins having a different predetermined total tens and units value respectively for each key, said means comprising a plurality of coin magazines, means for ejecting coins from said magazines, and selectively settable means for operating said ejecting means.

13. In a coin issuing device, the combination of a keyboard having ten operable selector keys, said keys being operable singly and successively in combinations, a plurality of groups of stops mounted for movement between retracted and actuated positions, one stop of each group being normally positioned for actuation by a key, means operable by any of the keys for positioning the next stop of each group for actuation, means on each key for operating the positioned stop in a predetermined group of stops upon successive key operations, means under control of said actuated stops for issuing coins having a different predetermined total value for each key and combinations of keys, said means comprising a plurality of coin magazines, ejector means associated with each magazine, selectively settable means for operating said ejector means, a series of cams provided with means for setting the settable means, said cams having a plurality of positions determined by said actuated stops and adapted to present a different predetermined pattern of selector setting means at each position.

14. In a coin issuing device, the combination of a keyboard having ten operable selector keys, said keys being operable singly and successively in combinations, a plurality of groups of stops mounted for movement between retracted and actuated positions, one stop of each group being normally positioned for actuation by a key, means operable by any of the keys for positioning the next stop of each group for actuation, means on each key for operating the positioned stop in a predetermined group of stops upon successive key operations, and means under control of said actuated stops for issuing coins having a different predetermined total value for each key and combinations of keys, said means comprising a plurality of coin magazines, ejector means associated with each magazine, selectively settable means for operating said ejector means, a series of cams provided with means for setting said settable means, said cams having a plurality of positions and adapted to present a different predetermined pattern of setting means at each position, and means under control of said actuated stops for moving said cams to the position corresponding to the key which was operated.

15. In a coin issuing device, the combination of a keyboard having ten operable selector keys, said keys being operable singly and successively in combinations, a plurality of stops mounted for movement between retracted and actuated positions, one stop of each group being normally positioned for actuation by a key, means operable by any of the keys for positioning the next stop of each group for actuation, means on each key for operating the positioned stop in a predetermined group of stops upon successive key operations, and means under control of said actuated stops for issuing coins having a different predetermined total value for each key and combinations of keys, said means comprising a plurality of coin magazines, ejector means associated with each magazine, selectively settable means for operating said ejector means, a series of cams provided with means for setting the settable means, said cams having a plurality of positions and adapted to present a different predetermined pattern of selector setting means at each position, said positions being determined by the actuated stops, and means operable after each operation of the ejector means for restoring said cams and selectors to initial position.

16. In a coin issuing device, the combination of a keyboard having ten operable selector keys, said keys being operable singly and successively in combinations, a plurality of stops mounted for movement between retracted and actuated positions, one stop of each group being normally positioned for actuation by a key, means operable by any of the keys for positioning the next stop of each group for actuation, means on each key for operating the positioned stop in a predetermined group of stops upon successive key operations, and means under control of said actuated stops for issuing coins having a different predetermined total value for each key and combinations of keys, said means comprising a plurality of coin magazines, ejector means associated with each magazine, selectively settable means for operating said ejector means, a series of cams provided with means for setting the settable means, said cams having a plurality of positions and adapted to present a different predetermined pattern of selector setting means at each position, means operable after each operation of the ejector means for restoring said cams and selectors to initial position, and means operable after restoration of said cams to initial position for restoring said set stops.

17. In a coin issuing machine, the combination of a keyboard comprising ten operable selector keys, a row of stops, means mounting said stops for movement between retracted and actuated positions, means on each key for operating a predetermined one of the stops, a control element mounted for movement parallel to said row of stops, abutment means on said element adapted to engage an actuated stop, and means under control of said element for issuing coins having a different predetermined total value corresponding to the amplitude of movement of said element.

18. In a coin issuing machine, the combination of a keyboard comprising ten operable selector keys, a plurality of rows of stops extending transversely of the keyboard, the corresponding stops in all rows being disposed in alignment transversely of the rows, a support for said stops mounted for shifting movement parallel to said rows, said stops being mounted in said support for movement between retracted and actuated positions, means on each key for operating the stops in a predetermined row, control elements mounted for movement transversely of said rows of stops, abutment means on each element adapted to engage an actuated stop to limit the movement of the element, means operable upon actuation of a key for shifting said support parallel to said rows to position the actuated stops for engagement by said abutment means, and means under control of said elements for issuing coins having a different predetermined total value corresponding to the amplitude of movement of said elements.

19. In a coin issuing machine, the combination of a keyboard comprising ten operable selector keys, a plurality of rows of stops extending transversely of the keyboard, the corresponding stops in all rows being disposed in alignment transversely of the rows, means mounting said stops for movement as a group parallel to said rows and individually between retracted and actuated positions, means on each key for individually operating the stops in a predetermined row, two parallel control elements mounted for movement past said transversely aligned stops, abutment means on each element adapted to engage an actuated stop to variably limit the amplitude of motion of said element, a plurality of coin magazines, ejector means therefor, and means settable by said control elements for selecting the ejector means to be operated.

20. In a coin issuing machine, the combination of a keyboard comprising ten operable selector keys, a plurality of rows of stops extending transversely of the keyboard, the corresponding stops in all rows being disposed in alignment transversely of the rows, means mounting said stops for movement as a group parallel to said rows and individually between retracted and actuated positions, means on each key for individually operating the stops in one row, two parallel control elements mounted for movement past said transversely aligned stops, abutment means on each element adapted to engage an actuated stop to variably limit the amplitude of motion of said element, a plurality of coin magazines, ejector means therefor, and means settable by said control elements for selecting the ejector means to be operated, and means operable after such selection for actuating the selected ejecting means.

21. In a coin issuing machine, the combination of a keyboard comprising ten operable selector keys, a plurality of rows of stops extending transversely of the keyboard, the corresponding stops in all rows being disposed in alignment transversely of the rows to form a set, means mounting said stops for movement as a group parallel to said rows and individually between retracted and actuated positions, means on each key for individually operating the stops in one row, two parallel control elements having an initial position and mounted for movement parallel to said sets of stops and in operative alignment with adjacent sets, abutment means on each element adapted to engage an actuated stop to variably limit the amplitude of motion of the element, a plurality of coin magazines, ejector means therefor, an interponent for each ejector, movable to and from operating position with respect thereto, means operable by said elements for selecting and positioning certain of said interponents and means for actuating said selected interponents to actuate said ejectors.

22. In a coin issuing machine, the combination of a keyboard comprising ten operable selector keys, a plurality of rows of stops extending transversely of the keyboard, the corresponding stops in all rows being disposed in alignment transversely of the rows to form a set, means mounting said stops for movement as a group parallel to said rows and individually between retracted and actuated positions, means on each key for individually operating the stops in one row, two parallel control elements having an initial position and mounted for movement parallel to said sets of stops and in operative alignment with adjacent sets, abutment means on each element adapted to engage an actuated stop to variably limit the amplitude of motion of the element, a plurality of coin magazines, ejector means therefor, an interponent movable to and from operating position with respect to each ejector, means including a cam disposed in controlling relation to each interponent for moving it to actuating position, means connecting said cams for operation by said elements and subsequently operable means for actuating said positioned interponents to operate the ejectors.

23. In a coin issuing machine, the combination of a keyboard comprising ten operable selector keys, a plurality of rows of stops extending transversely of the keyboard, the corresponding stops in all rows being disposed in alignment transversely of the rows to form sets, means mounting said stops for movement as a group parallel to said rows and individually between retracted and actuated positions, means on each key for individually operating the stops in one row, two parallel control elements having an initial position and mounted for movement parallel to said sets of stops and in operative alignment with adjacent sets, abutment means on each element adapted to engage an actuated stop to variably limit the amplitude of motion of the element, a plurality of coin magazines, ejector means therefor, an interponent for each ejector, movable to and from operating position with respect thereto, means operable by said elements for selecting and positioning certain of said interponents to operate the corresponding ejectors, means for actuating said selected interponents to actuate said ejectors and means for moving said selected interponents from operating position after operation of the ejectors.

24. In a coin issuing machine, the combination of a keyboard comprising ten operable selector keys, a plurality of rows of stops extending transversely of the keyboard, the corresponding stops in all rows being disposed in alignment transversely of the rows to form sets, means mounting said stops for movement as a group parallel to said rows and individually between retracted and actuated positions, means on each key for individually operating the stops in one row, two parallel control elements each having an initial positon and mounted for movement parallel to said sets of stops and in operative alignment with adjacent sets, abutment means on each element adapted to engage an actuated stop to variably limit the amplitude of motion of the element, a plurality of coin magazines, ejector means therefor, an interponent for each ejector, movable to and from operation position with respect thereto, means operable by said elements for selecting and positioning certain of said interponents, means for actuating said selected interponents to actuate said ejectors, means for moving said selected interponents from operating position after operation of the ejectors, and additional means for restoring said control elements to their initial positions.

25. In a coin issuing machine, the combination of a keyboard comprising ten operable selector keys, a plurality of rows or stops extending transversely of the keyboard, the corresponding stops in all rows being disposed in alignment transversely of the rows to form sets, means mounting said stops for movement as a group parallel to said rows and individually between retracted and actuated positions, means on each key for individually operating the stops in one row, two parallel control elements having an initial position and mounted for movement parallel to said sets of stops, abutment means on each element adapted to engage an actuated stop to variably limit the amplitude of motion of the element, a plurality of coin magazines, ejector means therefor, an interponent for each ejector, movable to and from operating position with respect thereto, means operable by said elements for selecting and positioning certain of said interponents, means for actuating said selected interponents to actuate said ejectors, means for moving said selected interponents from operating position after operation of the ejectors, additional means for restoring said control elements to their initial positions, and means operable after said control elements are restored for resetting said stops.

26. In a coin issuing machine, the combination of a keyboard comprising ten operable selector keys, a plurality of rows of stops extending transversely of the keyboard, the corresponding stops in all rows being disposed in alignment transversely of the rows to form sets, means mounting said stops for movement as a group parallel to said rows and individually between retracted and actuated positions, means on each key for individually operating the stops in one row, two parallel control elements having an initial position and mounted for movement parallel to said sets of stops and in operative alignment with adjacent sets, abutment means on each element adapted to engage an actuated stop to variably limit the amplitude of motion of the element, a plurality of coin magazines, ejector means therefor, an interponent for each ejector, movable to and from operating position with respect to said ejector, means operable by said elements for selecting and positioning certain of said interponents, and means for actuating said selected interponents to actuate said ejectors, means for moving said selected interponents from operating position after operation of the ejectors, additional means for restoring said control elements to their initial position, and means operable after said control elements are restored for resetting said stops both individually and as a group.

27. In a coin issuing machine, the combination of a keyboard comprising ten operable selector keys, a plurality of rows of stops extending transversely of said keyboard, the corresponding stops in all rows being disposed in alignment transversely of the rows to form sets, means mounting said stops for movement as a group parallel to said rows and individually between retracted and actuated positions, means on each key for individually operating the stops in one row, two parallel control elements having an initial position and mounted for movement parallel to said sets of stops and in operative relation to adjacent sets, abutment means on each element adapted to engage an actuated stop to variably limit the amplitude of motion of the element, a plurality of coin magazines, ejector means therefor, an interponent movable to and from operating position with respect to each ejector, means including a cam disposed in controlling relation to each interponent for moving it to actuating position, said cams being grouped and each group being fixed to a shaft, and means connecting each shaft for operation by one of said elements and subsequently operable means for actuating said positioned interponents to operate the ejectors.

28. In a coin issuing machine, the combination of a keyboard comprising ten operable selector keys, ten rows of settable stops extending transversely of the keyboard, the corresponding stops in all rows being disposed in alignment transversely of the rows to form sets, means mounting said stops for movement as a group parallel to said rows and individually between retracted and set positions, means on each key for individually operating the stops in one row, two parallel control elements having an initial position and mounted for movement parallel to said sets of stops, abutment means on each element adapted to engage an actuated stop to variably limit the amplitude of motion of the element, a plurality of coin magazines, ejector means therefor, an interponent movable to and from operating position with respect to each ejector, means including a cam disposed in controlling relation to each interponent for moving it to actuating position, said cams being grouped and each group being fixed to a shaft, means connecting each shaft for operation by one of said elements, said cam shafts having ten different positions corresponding to the ten stops in a set, means, including means on the cams for moving said interponents, said means on said cams being arranged in a predetermined pattern for each position of each shaft, said patterns corresponding to the total value of coins to be issued for the stops set.

29. In a coin issuing machine, the combination of a keyboard comprising ten operable selector keys, a row of stops, means mounting said stops for movement between retracted and actuated positions, means on each key for operating a predetermined one of the stops, a control element mounted for movement parallel to said row of stops, abutment means on said element adapted to engage an actuated stop, a cam shaft, cams on said shaft having the same number of positions as there are stops, means connecting said shaft for rotation by said element, an interponent for each cam operable from initial to actuating position, means including selecting means on said cams adapted to actuate the interponents to actuated positions, a plurality of coin magazines, ejectors for ejecting coins therefrom, each interponent when in actuated position being adapted to contact an ejector, and means for thereafter moving said positioned interponents to actuate their associated ejectors.

30. In a coin issuing machine, the combination of a keyboard comprising ten operable selector keys, a row of stops, means mounting said stops for movement between retracted and actuated positions, means on each key for operating a predetermined one of the stops, a control element mounted for movement parallel to said row of stops, abutment means on said element adapted to engage an actuated stop, a cam shaft, cams on said shaft having the same number of positions as there are stops, means connecting said shaft for rotation by said element, an interponent for each cam, operable from initial to actuating position, means including selecting means on said cams adapted to position the interponents in actuated positions, a plurality of coin magazines, ejectors for ejecting coins therefrom, each interponent when positioned being adapted to contact an ejector, means for thereafter moving said positioned interponents to actuate their associated ejectors, said selecting means being arranged on said cams so as to actuate predetermined ones of said interponents corresponding to the particular coins to be ejected, for each position of said shaft.

31. In a coin issuing machine, the combination of a keyboard comprising ten operable selector keys, a row of stops, means mounting said stops for movement between retracted and actuated positions, means on each key for operating a predetermined one of the stops, a control element mounted for movement parallel to said row of stops, abutment means on said element adapted to engage an actuated stop, a cam shaft, cams on said shaft having the same number of positions as there are stops, means connecting said shaft for rotation by said element, an interponent for each cam, operable from initial to actuating position, means including selecting means on said cams adapted to position the interponents in actuated position, a plurality of coin magazines, ejectors for ejecting coins therefrom, each interponent when in actuated position being adapted to contact an ejector, means for thereafter moving said positioned interponents to actuate their associated ejectors, said cam shaft having an initial position, means operable after the operation of said ejectors for restoring said interponents and said cam shaft to their initial positions.

32. In a coin issuing machine, the combination of a keyboard comprising ten operable selector keys, a row of stops, means mounting said stops for movement between retracted and actuated positions, means on each key for operating a predetermined one of the stops, a control element mounted for movement parallel to said row of stops, abutment means on said element adapted to engage an actuated stop, a cam shaft, cams on said shaft having the same number of positions as there are stops, means connecting said shaft for rotation by said element, an interponent for each cam, operable from initial to actuating position, means including selecting means on said cams adapted to position the interponents in actuated positions, a plurality of coin magazines, ejectors for ejecting coins therefrom, each interponent when in actuated position being adapted to contact an ejector, means for thereafter moving said positioned interponents to actuate their associated ejectors, said cam shaft having an initial position, means operable after the operation of said ejectors for restoring said interponents and said cam shaft to their initial positions, and additional means operable in the course of operation of said restoring means for resetting said stops.

33. In a coin issuing machine, the combination of a keyboard comprising ten operable selector keys, a row of stops, means mounting said stops for movement between retracted and actuated positions, means on each key for operating a predetermined one of the stops, a control element mounted for movement parallel to said row of stops, abutment means on said element adapted to engage an actuated stop, a cam shaft, cams on said shaft having the same number of positions as there are stops, means connecting said shaft for rotation by said element, an interponent for each cam, operable from initial to actuating position, means including selecting means on said cams adapted to actuate the interponents to actuated positions, a plurality of coin magazines, ejectors for ejecting coins therefrom, each interponent when in actuated position being adapted to contact an ejector, means for thereafter moving said positioned interponents to actuate their associated ejectors, said cam shaft having an initial position, means operable after the operation of said ejectors for restoring said interponents to and holding them in their initial positions, means operable during the positioning of the cam shaft for rendering said restoring and holding means inoperative.

34. In a coin issuing machine, the combination of a keyboard comprising ten operable selector keys, a row of stops, means mounting said stops for movement between retracted and actuated positions, means on each key for operating a predetermined one of the stops, a control element mounted for movement parallel to said row of stops, abutment means on said element adapted to engage an actuated stop, a cam shaft, cams on said shaft having the same number of positions as there are stops, means connecting said shaft for rotation by said element, an interponent for each cam, operable from initial to actuating position, means including selecting means on said cams adapted to actuate their interponents to actuated positions, a plurality of coin magazines, ejectors for ejecting coins therefrom, each interponent when in actuated position being adapted to contact an ejector, and means for thereafter moving said positioned interponents to actuate their associated ejectors, said cam shaft having an initial position, means operable after the operation of said ejectors for restoring said interponents to and holding them in their initial positions, and means for rendering said holding and restoring means inoperative after the rotation of the cam shaft.

35. In a coin issuing machine, the combination of a keyboard comprising ten operable selector keys, a plurality of rows of stops extending transversely of the keyboard, the corresponding stops in all rows being disposed in alignment transversely of the rows to form sets, means mounting said stops for movement as a group parallel to said rows and individually between retracted and actuated positions, means on each key for operating the stops in one row, two parallel control elements mounted for movement parallel to said sets of stops, means responsive to the operation of a key for moving said stops as a group to position the operated stop in alignment with one element, abutment means on said element adapted to engage said operated stop to limit the amplitude of motion of the element, a plurality of coin magazines, ejector means therefor, an interponent adapted to operate each ejector, means operable by said elements for selecting and positioning certain of said interponents to operate the corresponding ejectors, and means for actuating said selected interponents.

36. In a coin issuing machine, the combination of a keyboard comprising ten operable selector keys, a plurality of rows of stops extending transversely of the keyboard, the corresponding stops in all rows being disposed in alignment transversely of the rows to form sets, means mounting said stops for movement as a group parallel to said rows and individually between retracted and actuated positions, means on each key for operating the stops in one row, two parallel control elements mounted for movement parallel to said sets of stops, means responsive to the operation of a key for moving said stops as a group to position the operated stop in alignment with one element, said means being also responsive to the operation of a second key for moving said stops to position the first operated stop in alignment with the other element and the second operated stop in alignment with said one element, abutment means on each element adapted to engage its corresponding actuated stop to limit the amplitude of motion of the element, a plurality of coin magazines, ejector means therefor, an interponent adapted to operate each ejector, means operable by said elements for selecting and positioning certain of said interponents to operate the corresponding ejectors, and means for actuating said selected interponents.

37. In a coin issuing device, the combination of a plurality of coin magazines, ejectors for said magazines, a ten key keyboard, settable means operable by said keys for selecting the ejectors to be operated, said operable means comprising a shiftably mounted stop carriage and means actuated by the operation of a key for shifting said carriage, means for thereafter operating said ejectors, said last named means comprising an ejector actuator, a motor, a clutch for coupling said motor to said actuator, means including a manually operable starter switch for actuating said clutch, a second switch connected in series with said first switch, and means operable upon shifting of said carriage for closing the second switch.

38. In a coin issuing device, the combination of a plurality of coin magazines, ejectors for said magazines, a ten key keyboard, settable means operable by said keys for selecting the ejectors to be operated, said operable means comprising a shiftably mounted stop carriage and means actuated by the operation of a key for shifting said carriage, means for thereafter operating said ejectors, said last named means comprising an ejector actuator, a motor, a clutch for coupling said motor to said actuator, means including a manually operable starter switch for actuating said clutch, a second switch connected in series with said first switch, means operable upon shifting of said carriage for closing the second switch and means for restoring said carriage to reopen said second switch.

39. In a coin issuing device, the combination of a plurality of coin magazines, ejectors for said magazines, a ten key keyboard, settable means operable by said keys for selecting the ejectors to be operated, said operable means comprising a shiftably mounted stop carriage and means actuated by the operation of a key for shifting said carriage, means for thereafter operating said ejectors, said last named means comprising an ejector actuator, a motor, a clutch for coupling said motor to said actuator, means including a manually operable starter switch for actuating said clutch, a second switch connected in series with said first switch, means operable upon shifting of said carriage for closing the second switch, means for restoring said carriage to reopen said second switch, mechanism comprising seekers mounted to enter the magazines when the coins therein fall below a predetermined level, and means for actuating said carriage restoring means when a seeker enters.

40. In a coin issuing device, the combination of a plurality of coin magazines, ejectors for said magazines, a ten key keyboard, settable means operable by said keys for selecting the ejectors to be operated, said operable means comprising a shiftably mounted stop carriage and means actuated by the operation of a key for shifting said carriage, means for thereafter operating said ejectors, said last named means comprising an ejector actuator, a motor, a clutch for coupling said motor to said actuator, means including a manually operable starter switch for actuating said clutch, a second switch connected in series with said first switch, means operable upon shifting of said carriage for closing the second switch, means for restoring said carriage to reopen said second switch, mechanism comprising seekers mounted to enter the magazines when the coins therein fall below a predetermined level, and means for actuating said carriage restoring means when a seeker enters, said last named means being under control of said second switch.

41. In a coin issuing machine, the combination of a plurality of coin magazines, ejectors for said magazines, a keyboard comprising ten operable selector keys, a shiftable carriage, a plurality of stops mounted on the carriage, means operable upon actuation of a key for shifting said carriage, means mounting said stops for movement individually between retracted and actuated positions, key actuated means for moving said stops to actuated positions, said carriage serving to position said stops successively for operation by said key actuated means, two control elements mounted for movement from an initial position relative to said stops, abutment means on each element, each adapted to engage a separate, actuated stop, cam shafts, one operated by each element, having initial and actuated positions, cams on said shafts, cam followers adapted to engage said cams, means for normally holding said followers out of engagement with the cams, means forming stations arranged in predetermined patterns on said cams to receive said followers, interponents mounted for movement by said followers into operating position with respect to said ejectors, means for operating said interponents to actuate said ejectors, a countershaft, a motor, clutch means adapted, when effective, to clutch said motor to said countershaft, means for rendering said clutch ineffective after the countershaft has made one revolution, means on said countershaft for restoring said control elements to and for holding them in the initial position, means on said countershaft for rendering said follower holding means ineffective and means on said countershaft for actuating said interponent operating means.

42. In a coin issuing machine, the combination of a plurality of coin magazines, ejectors for said magazines, a keyboard comprising ten operable selector keys, a shiftable carriage, a plurality of stops mounted on the carriage, means operable upon actuation of a key for shifting said carriage, means mounting said stops for movement individually between retracted and actuated positions, key actuated means for moving said stops to actuated positions, said carriage serving to position said stops successively for operation by said key actuated means, two control elements mounted for movement from an initial position relative to said stops, abutment means on each element, each adapted to engage a separate, actuated stop, cam shafts, one operated by each element, having initial and actuated positions, cams on said shafts, cam followers adapted to engage said cams, means for normally holding said followers out of engagement with the cams, means forming stations arranged in predetermined patterns on said cams to receive said followers, interponents mounted for movement by said followers into operating position with respect to said ejectors, means for operating said interponents to actuate said ejectors, a countershaft, a motor, clutch means adapted, when effective, to clutch said motor to said countershaft, means for rendering said clutch ineffective after the countershaft has made one revolution, means on said countershaft for restoring said control elements and cam shafts to and for holding them in the initial position, means on said countershaft for rendering said follower holding means ineffective and for thereafter restoring it, and means on said countershaft for actuating said interponent operating means and returning it to initial position.

43. In a coin issuing machine, the combination of a plurality of coin magazines, ejectors for said magazines, a keyboard comprising ten operable selector keys, a shiftable carriage, a plurality of stops mounted on the carriage, means operable upon actuation of a key for shifting said carriage, means mounting said stops for movement individually between retracted and actuated positions, key actuated means for moving said stops to actuated positions, said carriage serving to position said stops successively for operation by said key actuated means, two control elements mounted for movement from an initial position relative to said stops, abutment means on each element, each adapted to engage a separate, actuated stop, cam shafts, one operated by each element, having initial and actuated positions, cams on said shafts, cam followers adapted to engage said cams, means for normally holding said followers out of engagement with the cams, means forming stations arranged in predetermined patterns on said cams to receive said followers, interponents mounted for movement by said followers into operating position with respect to said ejectors, means for operating said interponents to actuate said ejectors, a countershaft, a motor, clutch means adapted, when effective, to clutch said motor to said countershaft, means for rendering said clutch ineffective after the countershaft has made one revolution, means on said countershaft for restoring said control elements to and for holding them in the initial position, means on said countershaft for rendering said follower holding means ineffective, means on said countershaft for actuating said interponent operating means, carriage resetting means, and means on said countershaft for actuating said resetting means.

44. In a coin issuing machine, the combination of a plurality of coin machines, ejectors for said magazines, a keyboard comprising ten operable selector keys, a shiftable carriage, a plurality of stops mounted on the carriage, means operable upon actuation of a key for shifting said carriage, means mounting said stops for movement individually between retracted and actuated positions, key actuated means for moving said stops to actuated positions, said carriage serving to position said stops successively for operation by said key actuated means, two control elements mounted for movement from an initial position relative to said stops, abutment means on each element, each adapted to engage a separate, actuated stop, cam shafts, one operated by each element, having initial and actuated positions, cams on said shafts, cam followers adapted to engage said cams, means for normally holding said followers out of engagement with the cams, means forming stations arranged in predetermined patterns on said cams to receive said followers, interponents mounted for movement by said followers into operating position with respect to said ejectors, means for operating said interponents to actuate said ejectors, a countershaft, a motor, clutch means adapted, when effective, to clutch said motor to said countershaft, means for rendering said clutch ineffective after the countershaft has made one revolution, motor control means operable by said clutch means to start and stop said motor when said clutch means is rendered effective or ineffective respectively, means on said countershaft for restoring said control elements to and for holding them in the initial position, means on said countershaft for rendering said follower holding means ineffective, and means on said countershaft for actuating said interponent operating means.

45. In a coin issuing machine, the combination of a plurality of coin magazines, ejectors for said magazines, a keyboard comprising ten operable selector keys, a shiftable carriage, a plurality of stops mounted on the carriage, means operable upon actuation of a key for shifting said carriage, means mounting said stops for movement individually between retracted and actuated positions, key actuated means for moving said stops to actuated positions, said carriage serving to position said stops successively for operation by said key actuated means, two control elements mounted for movement from an initial position relative to said stops, abutment means on each element, each adapted to engage a separate, actuated stop, cam shafts, one operated by each element, having initial and actuated positions, cams on said shafts, cam followers adapted to engage said cams, means for normally holding said followers out of engagement with the cams, means forming stations arranged in predetermined patterns on said cams to receive said followers, interponents mounted for movement by said followers into operating position with respect to said ejectors, means for operating said interponents to actuate said ejectors, a countershaft, a motor, clutch means adapted, when effective, to clutch said motor to said countershaft, means for rendering said clutch ineffective after the countershaft has made one revolution, means on said countershaft for restoring said control elements to and for holding them in the initial position, means on said countershaft for rendering said follower holding means ineffective, means on said countershaft for actuating said interponent operating means, electric means for rendering said clutch effective, means for resetting said carriage, means on said countershaft for energizing said resetting means, and means operable upon energization of said resetting means for conditioning said clutch for declutching.

46. In a coin issuing machine, the combination of a keyboard comprising ten operable selector keys, a row of stops, means mounting said stops for movement between retracted and actuated positions, means on each key for operating a predetermined one of the stops, a pair of control elements mounted for movement parallel to said row of stops, abutment means on said elements adapted to engage the actuated stops, cam shafts, cams on said shafts having the same number of positions as there are stops, means connecting said shafts for rotation by said elements, an interponent for each cam operable from initial to actuating position, means including selecting means on said cams adapted to actuate the interponents to actuated positions, a plurality of coin magazines including dime and nickel magazines, ejectors for ejecting coins therefrom, each interponent when in actuated position being adapted to contact an ejector, a bail mounted for movement from initial position into position to prevent the operation of the interponent actuating means for dime and nickel magazines to the value of twenty-five cents, key released means for holding said bail in initial position, and means for moving said positioned interponents to actuate their associated ejectors.

47. In a coin issuing machine, the combination of a keyboard comprising ten operable selector keys, a row of stops, means mounting said stops for movement between retracted and actuated positions, means on each key for operating a predetermined one of the stops, control elements mounted for movement parallel to said row of stops, abutment means on said elements adapted to engage the actuated stops, a pair of cam shafts, cams on said shafts having the same number of positions as there are stops, means connecting said shafts for rotation by said elements, an interponent for each cam operable from initial to actuating position, means including selecting means on said cams adapted to actuate the interponents to actuated positions, a plurality of coin magazines including dime and nickel magazines, ejectors for ejecting coins therefrom, each interponent when in actuated position being adapted to contact an ejector, a bail mounted for movement from initial position into position to prevent the operation of the interponent actuating means for dime and nickel magazines to the value of twenty-five cents, key operated means for releasing said bail from initial position, means for moving said bail toward preventing position, means on one cam shaft for preventing movement of said bail except in predetermined positions of said shaft, and means for thereafter moving said positioned interponents to actuate their associated ejectors.

48. In a coin issuing machine, the combination of a keyboard comprising ten operable selector keys, a row of stops, means mounting said stops for movement between retracted and actuated positions, means on each key for operating a predetermined one of the stops, control elements mounted for movement parallel to said rows of stops, abutment means on said elements adapted to engage the actuated stops, a pair of cam shafts, cams on said shafts having the same number of positions as there are stops, means connecting said shafts for rotation by said elements, an interponent for each cam operable from initial to actuating position, means including selecting means on said cams adapted to actuate the interponents to actuated positions, a plurality of coin magazines including quarter, dime and nickel magazines, ejectors for ejecting coins therefrom, each interponent when in actuated position being adapted to contact an ejector, a bail mounted for movement from initial position into position to prevent the operation of the interponent actuating means for dime and nickel magazines to the value of twenty-five cents, key operated means for releasing said bail from initial position, means for moving said bail toward preventing position, means on one cam shaft for preventing movement of said bail except in predetermined positions of said shaft, additional means operated by said key for preventing the operation of the interponent operating means for the quarter magazine, and means for thereafter moving said positioned interponents to actuate their associated ejectors.

ROBERT H. DAMON.
HAROLD E. FORESTER.
FRANCIS C. STURROCK.

REFERENCES CITED

The following references are of record in the file of this patent:

UNITED STATES PATENTS

| Number | Name | Date |
|---|---|---|
| 817,530 | Spengler | Apr. 10, 1906 |
| 1,007,167 | Wickline | Oct. 31, 1911 |
| 1,231,781 | Ovaitt | July 3, 1917 |
| 1,356,379 | McDermott | Oct. 19, 1920 |
| 1,482,171 | Weinman | Jan. 29, 1924 |
| 1,807,789 | Kuenstler | June 2, 1931 |
| 1,850,198 | Brandt | Mar. 22, 1932 |
| 1,899,444 | Mehan | Feb. 28, 1933 |
| 1,916,271 | Kiss | July 4, 1933 |
| 2,323,981 | Du Grenier | July 13, 1943 |